United States Patent
Nishio et al.

(10) Patent No.: US 12,279,219 B2
(45) Date of Patent: Apr. 15, 2025

(54) TRANSMISSION DEVICE AND TRANSMISSION METHOD

(71) Applicant: Panasonic Intellectual Property Corporation of America, Torrance, CA (US)

(72) Inventors: Akihiko Nishio, Osaka (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 435 days.

(21) Appl. No.: 17/798,266

(22) PCT Filed: Jan. 14, 2021

(86) PCT No.: PCT/JP2021/000939
§ 371 (c)(1),
(2) Date: Aug. 8, 2022

(87) PCT Pub. No.: WO2021/161710
PCT Pub. Date: Aug. 19, 2021

(65) Prior Publication Data
US 2023/0049008 A1 Feb. 16, 2023

(30) Foreign Application Priority Data
Feb. 13, 2020 (JP) ................................ 2020-022772

(51) Int. Cl.
*H04W 56/00* (2009.01)
(52) U.S. Cl.
CPC ..... *H04W 56/0045* (2013.01); *H04W 56/006* (2013.01)

(58) Field of Classification Search
CPC .......... H04W 56/0045; H04W 56/006; H04W 56/004; H04W 56/001; H04B 7/1853
See application file for complete search history.

(56) References Cited

U.S. PATENT DOCUMENTS 10,892,853 B2 * 1/2021 Kobayashi .......... H04L 27/2017
2017/0367116 A1 12/2017 Li et al.
(Continued)

FOREIGN PATENT DOCUMENTS

WO WO 2019109270 A1 6/2019
WO WO 2019195457 A1 10/2019

OTHER PUBLICATIONS

Ericsson,"On NTN synchronization, random access, and timing advance," R1-1912725,Agenda Item: 7.2.5.3, 3GPP TSG RAN WG1 Meeting #99, Reno, USA, Nov. 18-22, 2019. (20 pages).
(Continued)

*Primary Examiner* — Sharad Rampuria
(74) *Attorney, Agent, or Firm* — Seed IP Law Group LLP

(57) ABSTRACT

Appropriate timing control is realized in accordance with propagation delay between a terminal and a base station. This terminal includes: a control unit that controls a transmission timing on the basis of first information relating to control of transmission timing of signals in a transmission increment of the signals, and second information relating to control of transmission timing in a finer increment than in the transmission increment; and a wireless transmission unit that performs signal transmission on the basis of control of the transmission timing by the control unit.

12 Claims, 14 Drawing Sheets

(56) References Cited

U.S. PATENT DOCUMENTS

2019/0349983 A1* 11/2019 Loehr .................. H04W 72/23
2020/0178219 A1* 6/2020 Hoshino ............... H04L 1/0027
2022/0182960 A1 6/2022 Liu et al.

OTHER PUBLICATIONS

MediaTek Inc., "PRACH design for NTN scenario," R1-1909983, Agenda item: 7.2.5.3, 3GPP TSG RAN WG1 Meeting #98bis, Chongqing, China, Oct. 14-20, 2019. (13 pages).
OPPO, "NTN operation for Doppler and Timing Advance," R1-1910387, Agenda Item: 1 7.2.5.3, 3GPP TSG RAN WG1 #98bis, Chongqing, China, Oct. 14-20, 2019, 4 pages.
3GPP, "3rd Generation Partnership Project; Technical Specification Group Radio Access Network; Solutions for NR to support non-terrestrial networks (NTN) (Release 16)," 3GPP TR 38.821 V16.0.0, Dec. 2019, 140 pages.
3GPP, "3rd Generation Partnership Project; Technical Specification Group Radio Access Network; Study on Scenarios and Requirements for Next Generation Access Technologies; (Release 16)," 3GPP TR 38.913 V16.0.0, Jul. 2020, 40 pages.
3GPP, "3rd Generation Partnership Project; Technical Specification Group Services and System Aspects; System Architecture for the 5G System; Stage 2 (Release 16)," 3GPP TS 23.501 V16.1.0, Jun. 2019, 368 pages.
3GPP, "3rd Generation Partnership Project; Technical Specification Group Radio Access Network; NR; Requirements for support of radio resource management (Release 15)," 3GPP TS 38.133 V15.6.0, Jun. 2019, 999 pages.
3GPP, "3rd Generation Partnership Project; Technical Specification Group Radio Access Network; NR; Physical channels and modulation (Release 15)," 3GPP TS 38.211 V15.6.0, Jun. 2019, 97 pages.
3GPP, "3rd Generation Partnership Project; Technical Specification Group Radio Access Network; NR; Physical channels and modulation (Release 15)," 3GPP TS 38.211 V15.8.0, Dec. 2019, 97 pages.
3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019, 99 pages.
3GPP, "3rd Generation Partnership Project; Technical Specification Group Radio Access Network; NR; Medium Access Control (MAC) protocol specification (Release 15)," 3GPP TS 38.321 V15.8.0, Dec. 2019, 78 pages.
3GPP, "3rd Generation Partnership Project; Technical Specification Group Radio Access Network; NR; Physical layer procedures for control (Release 16)," 3GPP TS 38.213 V16.0.0, Dec. 2019, 146 pages.
International Search Report, mailed Apr. 13, 2021, for International Application No. PCT/JP2021/000939, 3 pages. (with English translation).
MediaTek Inc., "Physical layer control procedure in NR-NTN," R1-1908014, 3GPP TSG RAN WG1 Meeting #98, Prague, Czech Republic, Aug. 26-30, 2019, 5 pages.
Panasonic, "Timing advance and PRACH design for NTN," R1-1912903, 3GPP TSG RAN WG1 #99, Reno, USA, Nov. 18-22, 2019, 13 pages.
Extended European Search Report, dated Jun. 16, 2023, for European Patent Application No. 21753984.0-1206. (13 pages).

* cited by examiner

TRANSMISSION DEVICE AND TRANSMISSION METHOD

TECHNICAL FIELD

The present disclosure relates to a transmission apparatus and a transmission method.

BACKGROUND ART

In the standardization of 5G, New Radio access technology (NR) was discussed in 3GPP and the Release 15 (Rel. 15) specification for NR was published.

CITATION LIST

Non-Patent Literature

NPL 1
  3GPP, TR 38.821, V16.0.0 "Solutions for NR to support non-terrestrial networks (NTN) (Release 16)"
NPL 2
  3GPP, TS 38.321, V15.8.0 "Medium Access Control (MAC) protocol specification (Release 15)"

SUMMARY OF INVENTION

However, there is scope for further study on an appropriate timing control depending on a propagation delay of propagation between a terminal and a base station.

One non-limiting and exemplary embodiment of the present disclosure facilitates providing a transmission apparatus, and a transmission method capable of realizing the appropriate timing control depending on a propagation delay of propagation between the terminal and the base station.

A transmission apparatus according to one exemplary embodiment of the present disclosure includes: control circuitry, which, in operation, controls a transmission timing based on first information on a control on the transmission timing of a signal in a transmission unit for the signal and second information on the control on the transmission timing in a unit finer than the transmission unit; and
  transmission circuitry, which, in operation, performs signal transmission based on the control on the transmission timing by the control circuitry.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

According to an exemplary embodiment of the present disclosure, it is possible to realize an appropriate timing control depending on a propagation delay of propagation between a terminal and a base station.

Additional benefits and advantages of one aspect of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, embodiments of the present disclosure will be described in detail with reference to the accompanying drawings.

Extension to Non-Terrestrial Network (NTN)

New Radio access technology (NR) Release 15 (Rel. 15) has been specified as radio access technology for terrestrial networks. In the meantime, in NR, extension to Non-Terrestrial Networks (NTNs) such as communications using a satellite and/or a high-altitude pseudolite (High-altitude platform station (HAPS)) is considered (e.g., see Non-Patent Literature (hereinafter referred to as "NPL") 1). In an NTN environment, for example, a terminal and a base station perform radio communication via a satellite. Hereinafter, a radio link between the terminal and the satellite may be referred to as a "service link," and a radio link between the satellite and the base station may be referred to as a "feeder link."

In an NTN environment, a satellite's coverage area (e.g., one or more cells) for a terrestrial terminal or a terminal on an aircraft is formed by beams from the satellite. In addition, the round-trip time of radio wave propagation between the terminal and the satellite is determined by the altitude of the satellite (e.g., up to about 36,000 km) and/or the angle viewed from the terminal, i.e., the location relationship between the satellite and the terminal. Further, when the base station is disposed on the ground GW (Gateway), the round-trip time of radio wave propagation between the base station and the terminal is obtained by further adding the round-trip time of the radio wave propagation between the satellite and the ground GW to the round-trip time between the satellite and the terminal.

For example, NPL 1 describes that in an NTN, the Round Trip Time (RTT) of radio wave propagation between a base station and a terminal is up to about 540 ms. In addition, NPL 1 describes that a maximum delay difference of about 10 ms is caused depending on the position of the terminal within beams (within a cell). The maximum delay difference indicates, for example, a difference between, on one hand, the round-trip time between a terminal at the farthest position from the satellite and the satellite and, on the other hand, the round-trip time between a terminal at the nearest position from the satellite and the satellite within the beams (within the cell).

Random Access Procedure

In 5G NR, the terminal performs transmission using a random access channel for initial access and data transmission request, etc. For example, a random access procedure is performed by 4-step random access (also referred to as "4-step Random Access Channel (RACH) or "4-Step Contention Based Random Access (CBRA)).

Figure 1:
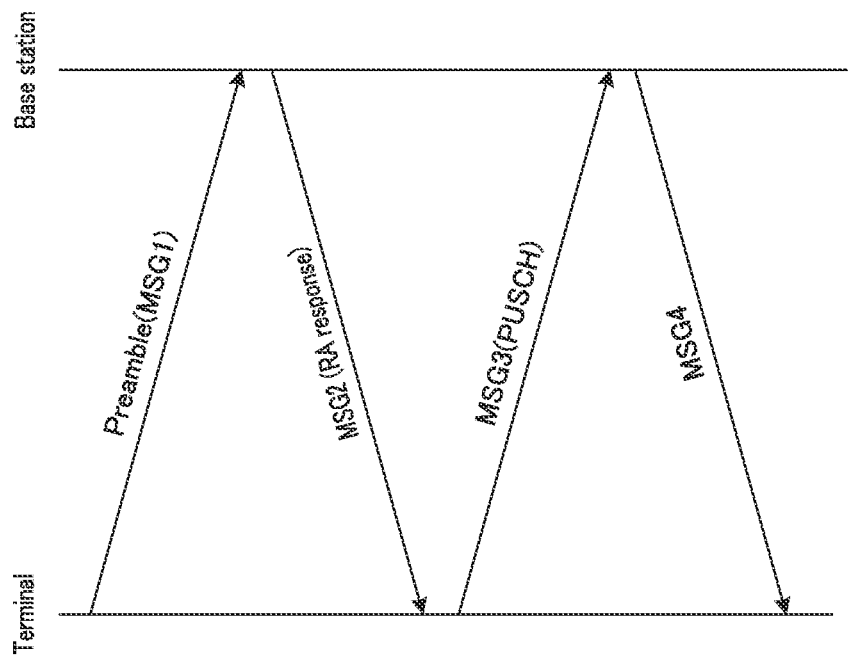
FIG. 1 illustrates an example of a 4-step random access procedure.

FIG. 1 illustrates an example of the 4-step random access procedure. In the 4-step random access, for example, as illustrated in FIG. 1, a terminal (UE) transmits a Preamble signal of a Physical Random Access Channel (PRACH) to a base station (gNB) in transmission (MSG1) at the first step. The MSG1 transmission by the terminal is performed at a transmission timing (slot timing or RACH Occasion) notified per cell by the base station. In the following description, transmitting a PRACH signal (e.g., a Preamble signal) may be abbreviated as "PRACH transmission" or "transmitting a PRACH." Also, in the following, receiving a PRACH signal may be described as "PRACH reception" or "receiving a PRACH." The transmission and reception of signals of other channels may also be abbreviated in the same manner.

The base station receives and decodes MSG1, and, in transmission (MSG2) at the second step, notifies the terminal of a Random Access response (RA response (RAR)) to the Preamble signal of the PRACH, scheduling information including an uplink transmission timing of MSG3, and the like.

The terminal receives and decodes MSG2, and, in transmission (MSG3) at the third step, notifies the base station of information for Connection establishment such as information on the terminal (e.g., terminal ID or the like) using the scheduling information indicated by MSG2. MSG3 is notified, for example, in a Physical Uplink Shared Channel (PUSCH). The information notified by MSG3 may be referred to as Radio Resource Control (RRC) connection request information.

The base station receives and decodes MSG3 and notifies a Connection establishment response or the like in transmission (MSG4) at the fourth step.

Timing Adjustment

In 5G NR, transmission timings of transmission by different terminals in a cell are controlled so that reception timings at which the base station receives signals transmitted by the terminals are within a certain period of time for the base station. For example, the phrase "within a certain period of time" means "within a Cyclic Prefix (CP) of an Orthogonal Frequency Division Multiplexing (OFDM) signal or a Discrete Fourier Transform-Spread-OFDM (DFT-S-OFDM) signal."

In the random access procedure, an MSG1 transmission by a terminal is performed at a transmission timing (RACH Occasion) notified per cell by the base station. Here, the terminal determines the transmission timing based on the reception timing of a synchronization signal called Synchronization Signal Block (SSB) transmitted by the base station in the downlink. Accordingly, depending on a propagation delay between the base station and the terminal, the reception timing at the base station deviates from the reception timing assumed by the base station. Here, the reception timing assumed by the base station is, for example, a reception timing determined based on the transmission timing (RACH Occasion) notified by the base station for each cell.

To avoid deviation, the base station transmits information for correcting (adjusting) the timing to the terminal in MSG2. The information for correcting (adjusting) the timing may be referred to as a TA (Timing Advance) command (for example, NPL 2). Based on the TA command included in MSG2, the terminal corrects a transmission timing of transmission performed after MSG3. In addition, in transmission and reception of signals after MSG3, the base station transmits the TA command to the terminal when having detected a deviation in reception timing.

In the NTN, since the communication between the base station and the terminal is long distance communication, the propagation delay between the base station and the terminal is large and a difference in propagation delay between terminals is large as compared with the terrestrial cellular system. The difference in propagation delay between the terminals corresponds to, for example, a difference between, on one hand, a propagation delay between certain base station A and certain terminal a and, on the other hand, a propagation delay between base station A and terminal b different from terminal a.

Therefore, the reception timings of reception by the base station of PRACHs transmitted by different terminals are greatly different, and the reception processing at the base station becomes complicated. In addition, it may be impossible that the TA command specified in Rel. 15 corrects the propagation delay that occurs in the NTN environment. Further, when the range of values of the TA command is widened in order to correct a large propagation delay, the amount of information (for example, the number of bits) required for notification of the TA command increases.

For example, it is considered that the terminal calculates the propagation delay based on the distance between the terminal and the satellite estimated using the location information of the terminal obtained by a Global Navigation Satellite System (GNSS) or the like and the location information of the satellite obtained from the orbital information of the satellite (satellite ephemeris), and that the terminal autonomously performs timing adjustment.

Figure 2:
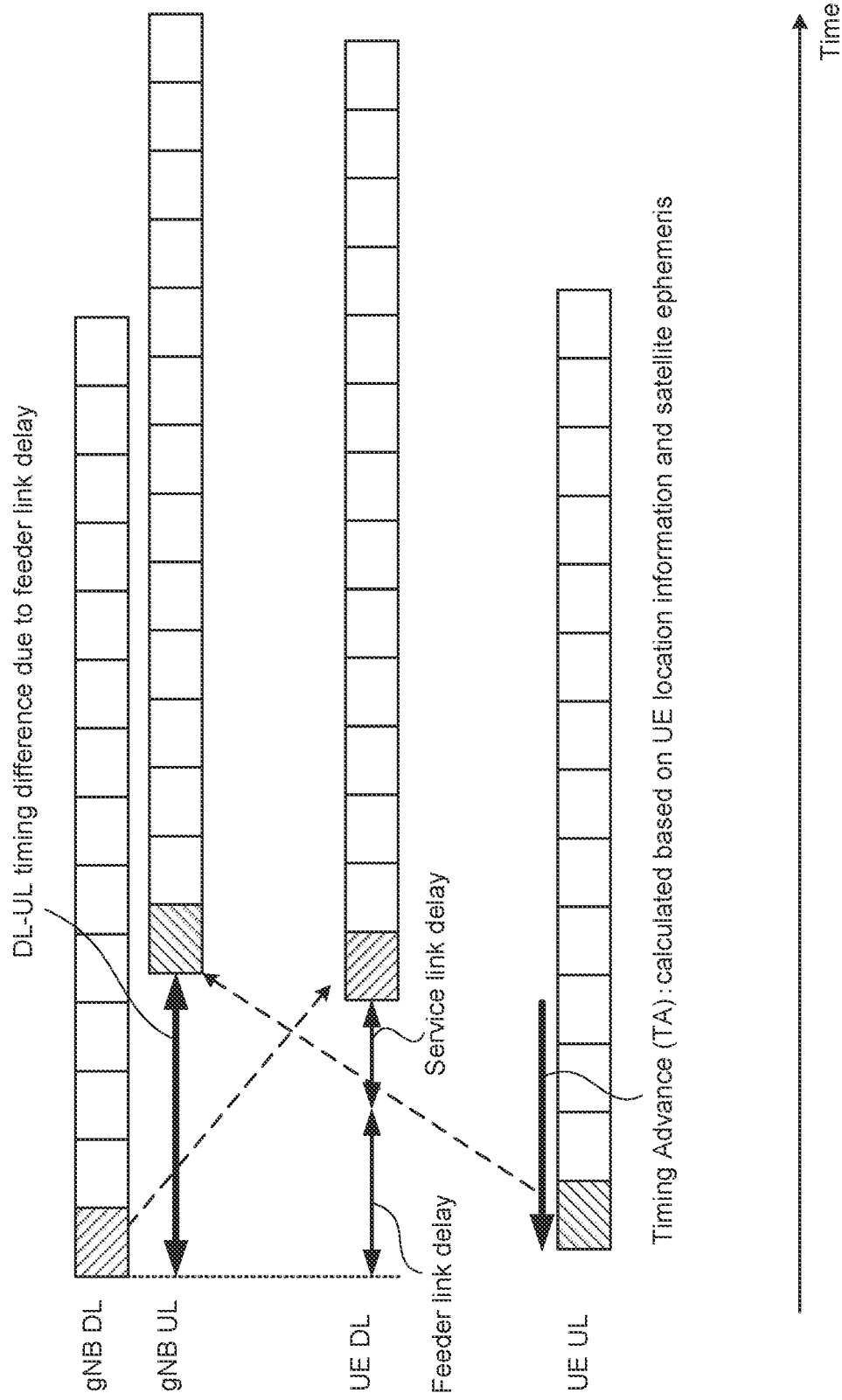
FIG. 2 illustrates one example of timing adjustment based on terminal location information and satellite orbital information.

FIG. 2 illustrates exemplary timing adjustment based on the location information of the terminal (UE location information) and the orbital information of the satellite (satellite ephemeris).

FIG. 2 illustrates downlink (DL) transmission slots and uplink (UL) reception slots for the base station (gNB), and DL reception slots and UL transmission slots for the terminal (UE). Note that, the horizontal axis of FIG. 2 represents the time axis.

FIG. 2 illustrates that a propagation delay between a transmission timing of a signal at the base station and a reception timing of the signal at the terminal is represented by a propagation delay in a feeder link (Feeder link delay) and a propagation delay in a service link (Service link delay). FIG. 2 also illustrates that the terminal adjusts the transmission timing of the signal using the TA determined based on the location information of the terminal and the orbital information of the satellite. In FIG. 2, the TA corresponds to twice the propagation delay in the service link, for example.

However, in the timing adjustment by the terminal based on the distance between the satellite and the terminal, the delay between the terminal and the satellite (i.e., the service link) is corrected, but the delay between the base station disposed on ground GW (Gateway) and the satellite (i.e., the feeder link) is not corrected. Further, in case that the satellite and the terminal are in a Non Line-of-Sight (NLOS) environment, the propagation delay calculated using the location information may differ from an actual propagation delay including reflections and/or diffractions occurring in the NLOS environment.

For 5G NR, in Rel. 15, a timing of a transmission slot is specified.

Figure 3:
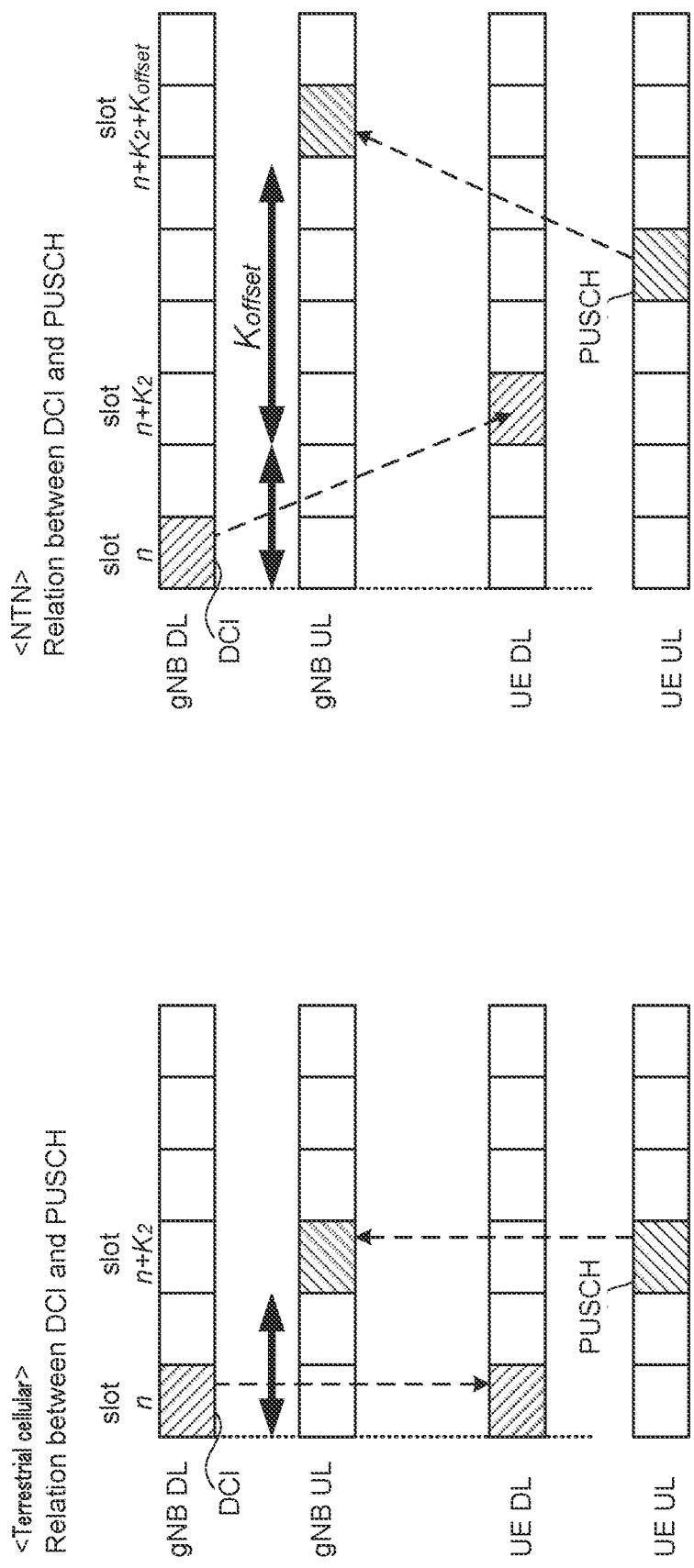
FIG. 3 illustrates one example of a transmission slot timing.

FIG. 3 illustrates an example of transmission slot timings. FIG. 3 illustrates an example of a transmission slot timing for a terrestrial cellular specified in Rel. 15 and an example of a transmission slot timing considered for the NTN.

FIG. 3 illustrates DL transmission slots and UL reception slots for the base station (gNB), and DL reception slots and UL transmission slots for the terminal (UE). Note that, the horizontal axis of FIG. 3 represents the time axis.

In FIG. 3, in accordance with the specifications for a transmission slot timing in Rel. 15, a signal including Downlink Control Information (DCI) is transmitted in the n-th slot by the base station to the terminal, and a PUSCH signal is transmitted in the n+$K_2$-th slot by the terminal to the base station.

As illustrated in FIG. 3, for the NTN, it is considered that offset $K_{offset,cell}$ (sometimes abbreviated as $K_{offset}$) for correcting a longer propagation delay than that in the terrestrial cellular is provided in the specifications with respect to the transmission slot timing in Rel. 15. For example, $K_{offset}$ is broadcast for each cell.

Meanwhile, a propagation delay (RTT) of the round trip between the terminal and the satellite differs depending on the location of the terminal in the cell. Accordingly, even when an offset for correcting the propagation delay longer than that in the terrestrial cellular is provided, it may happen that some terminals miss transmission, or wait a long time to perform transmission.

In addition, there is scope for further study in consideration of both the timing control using TA and the control on the transmission slot.

Therefore, one non-limiting and exemplary embodiment of the present disclosure achieves appropriate timing control depending on a propagation delay between the terminal and the base station in an environment in which the propagation delay between the terminal and the base station is large, such as, e.g., in the NTN environment, in consideration of both the timing control using TA and the control on the transmission slot.

Embodiment 1

[Overview of Communication System]

A communication system according to one embodiment of the present disclosure includes terminal 100 (corresponding to the transmission apparatus) and base station 200 (corresponding to the reception apparatus).

Figure 4:
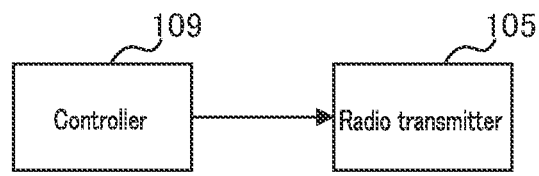
FIG. 4 is a block diagram illustrating a configuration example of a part of a terminal.

FIG. 4 is a block diagram illustrating a configuration example of a part of terminal 100. In terminal 100 illustrated in FIG. 4, controller 109 controls the transmission timing based on first information on the control on the transmission timing of a signal in a transmission unit for the signal and second information on the control on the transmission timing in a unit finer than the transmission unit. Radio transmitter 105 performs signal transmission based on the control on the transmission timing by controller 109.

Figure 5:
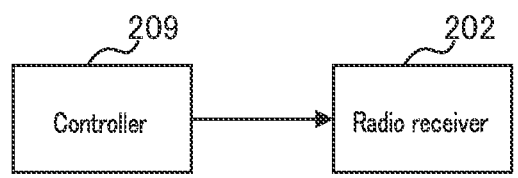
FIG. 5 is a block diagram illustrating a configuration example of a part of a base station.

FIG. 5 is a block diagram illustrating a configuration example of a part of base station 200. In base station 200 illustrated in FIG. 5, controller 209 controls the reception timing based on first information on the control on the reception timing of the signal in a reception unit for a signal and second information on the control on the transmission timing in a unit finer than the reception unit. Radio receiver 202 performs signal reception based on the control on the reception timing by controller 209.

[Configuration of Terminal]

Next, a configuration example of terminal 100 will be described.

Figure 6:
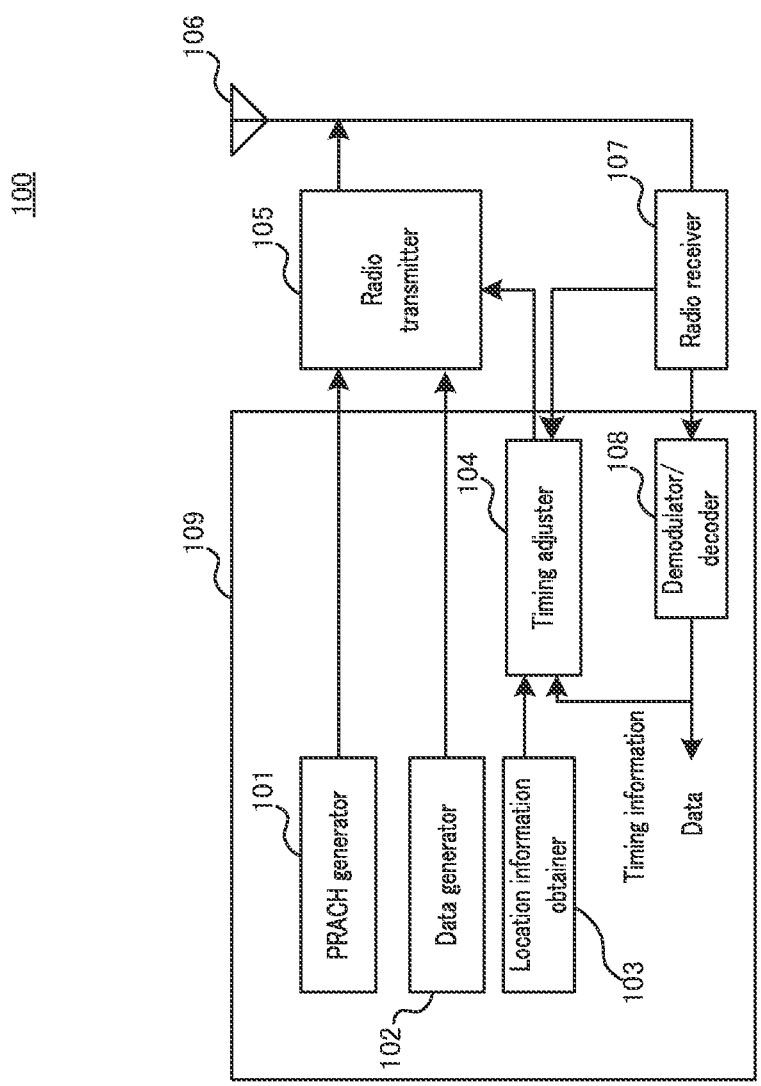
FIG. 6 is a block diagram illustrating one example of a configuration of the terminal according to Embodiment 1.

FIG. 6 is a block diagram illustrating one example of the configuration of terminal 100 according to present Embodiment 1. Terminal 100 includes PRACH generator 101, data generator 102, location information obtainer 103, timing adjuster 104, radio transmitter 105, antenna 106, radio receiver 107, and demodulator/decoder 108. PRACH generator 101, data generator 102, location information obtainer 103, timing adjuster 104, and demodulator/decoder 108 may be included in controller 109.

PRACH generator 101 determines PRACH transmission resources from among candidates for PRACH transmission resources available within the cell of base station 200, for example. For example, PRACH generator 101 configures a time-frequency resource and a Preamble number to be used for PRACH transmission based on information on time-frequency resources and a Preamble number group available for the PRACH transmission. The information on the time-frequency resources and Preamble number group available for the PRACH transmission, for example, is notified by base station 200.

Data generator 102 generates an uplink transmission data sequence, and generates a data signal to be transmitted by time-frequency resources for data signal transmission allocated by base station 200 and a Modulation and Coding Scheme (MCS).

Location information obtainer 103 obtains the location information (information such as latitude, longitude, and altitude) on the location of terminal 100 and the location information the location of the satellite being a communication partner by a GNSS function such as GPS. Location information obtainer 103 calculates the distance between terminal 100 and the satellite and outputs the calculated distance information to timing adjuster 104. The location information on the satellite may be obtained, for example, by obtaining orbital information called satellite ephemeris and/or time information in advance.

Timing adjuster 104 adjusts a reception timing of a received signal, and a transmission timing of a transmission signal. For example, timing adjuster 104 adjusts the transmission timing based on the information notified or broadcast by base station 200 and/or the information calculated by timing adjuster 104.

For example, timing adjuster 104 calculates the propagation delay time of propagation between the satellite and terminal 100 from the distance information outputted by location information obtainer 103 and the radio wave propagation speed. Then, timing adjuster 104 adjusts the transmission timing based on one of the reception timing of the signal transmitted by base station 200, the calculated propagation delay time, a timing adjustment value common to the cell broadcast by base station 200, and a timing adjustment value for terminal 100 notified by base station 200 (e.g., TA value), or based on a combination thereof. The timing adjustment may be different depending on the channel and/or the signal to be transmitted. For example, the timing adjustment may be different depending on the PRACH, PUSCH, Physical Uplink Control Channel (PUCCH), or Sounding Reference Signal (SRS). An example of the timing adjustment will be described later.

Radio transmitter 105 performs transmission processing such as D/A conversion, up-conversion, and the like on the signal outputted by PRACH generator 101, and on the data signal outputted by data generator 102. Radio transmitter 105 transmits a radio signal obtained by the transmission processing, at the transmission timing adjusted by timing adjuster 104, from antenna 106 to base station 200.

Radio receiver 107 receives a reception signal from base station 200 via antenna 106 at the reception timing adjusted by timing adjuster 104. The reception signal may be a downlink signal, for example, of a Physical Downlink Control Channel (PDCCH) or Physical Downlink Shared Channel (PDSCH). The reception signal may also include data and/or control information. Radio receiver 107 performs reception processing such as down-conversion and/or A/D conversion on the reception signal, and outputs the signal subjected to the reception processing to demodulator/decoder 108.

Demodulator/decoder 108 performs demodulation and decoding processing on the signal outputted by radio receiver 107. For example, demodulator/decoder 108 demodulates and decodes a response data signal of the PRACH. For example, when information on the transmission timing and reception timing is included in the demodulated and decoded information, demodulator/decoder 108 outputs the information to timing adjuster 104.

[Configuration of Base Station]

Figure 7:
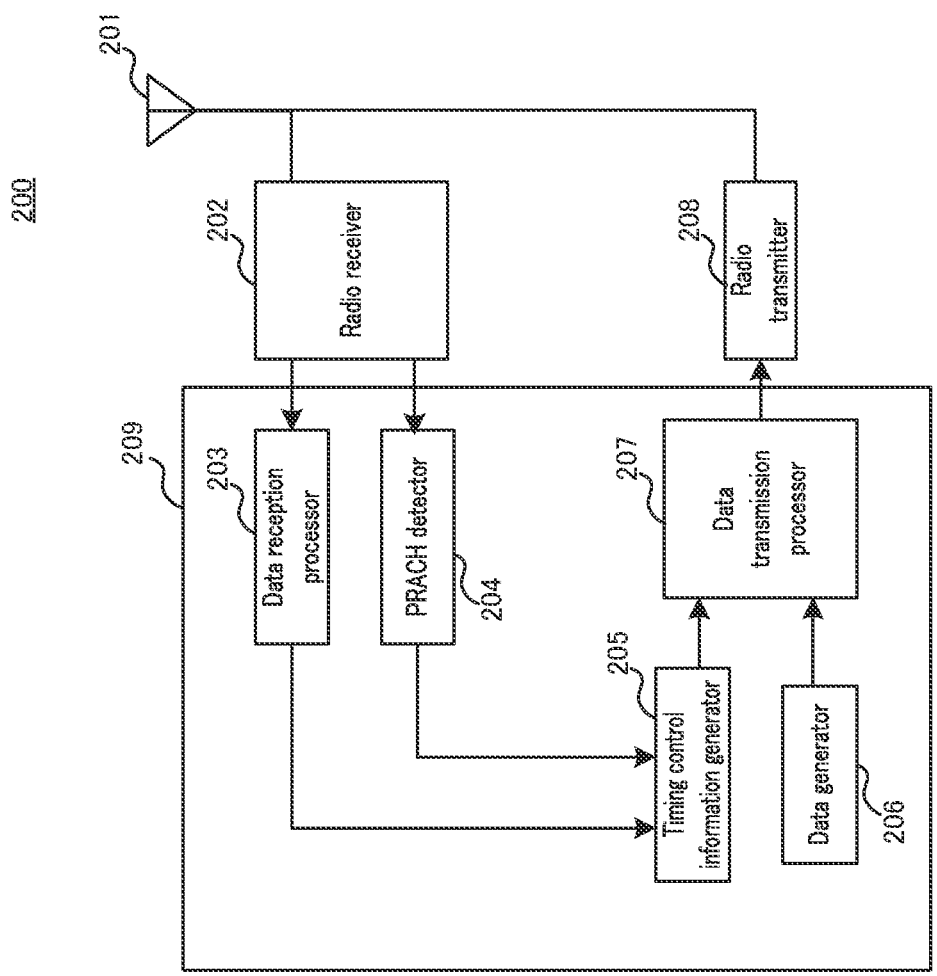
FIG. 7 is a block diagram illustrating one example of a configuration of the base station according to Embodiment 1.

FIG. 7 is a block diagram illustrating one example of the configuration of base station 200 according to present Embodiment 1. Base station 200 includes antenna 201, radio receiver 202, data reception processor 203, PRACH detector 204, timing control information generator 205, data generator 206, data transmission processor 207, and radio transmitter 208. Data reception processor 203, PRACH detector 204, timing control information generator 205, data generator 206, and data transmission processor 207 may be included in controller 209.

Radio receiver 202 performs reception processing such as down-conversion and/or A/D conversion on the data signal and PRACH signal received via antenna 201 from terminal 100, and outputs the signal subjected to the reception processing to data reception processor 203 and PRACH detector 204.

Data reception processor 203 performs the demodulation and decoding processing on the received data signal other than PRACH. Further, data reception processor 203 may also perform channel estimation and timing estimation based on the received data signal. Data reception processor 203 outputs information about the estimated timing to timing information generator 205.

PRACH detector 204 detects the Preamble signal of the PRACH and estimates the transmission timing and the reception timing by performing, on the Preamble signal of the PRACH received, correlation processing between the Preamble signal and a replicated signal of the Preamble signal generated using a sequence number and cyclic shift amount corresponding to a configured Preamble number.

The correlation processing in PRACH detector 204 may be processing performed in the time domain for calculating a delay profile, or may also be processing for calculating a delay profile by performing Inversed Fourier Transform (IFFT) processing after performing correlation processing (division process) in the frequency domain. The calculated delay profile may be used to estimate the transmission timing and/or reception timing.

PRACH detector 204 outputs, for example, information about the estimated transmission timing and/or reception timing to timing information generator 205. For example, PRACH detector 204 calculates a difference between the reference timing for base station 200 and the arrival timing of the received signal, and outputs a calculation result to timing information generator 205.

Timing information generator 205 generates a TA command for terminal 100 based on the information (e.g., timing estimation result) outputted by PRACH detector 204 and data reception processor 203. There may be a plurality of types of TA commands. Timing information generator 205 generates a timing adjustment value common to the cell. The timing adjustment value common to the cell is generated, for example, based on at least one of the size of a cell formed by a satellite beam, the length of a feeder link, and a feeder link delay amount.

Data generator 206 generates a downlink data signal including user data, a synchronization signal, system information (broadcast information), specific control information (for example, RRC control information), MAC control information for terminal 100, and the like. Data generator 206 outputs the generated downlink data signal to data transmission processor 207.

Data transmission processor 207 encodes and modulates the downlink data signal outputted by data generator 206 and the information outputted by timing information generator 205, and outputs the modulated signal to radio transmitter 208.

Radio transmitter 208 performs transmission processing such as D/A conversion, up-conversion, and amplification on the signal outputted by data transmission processor 207, and transmits, via antenna 201, the radio signal obtained by the transmission processing.

[Example of Timing Adjustment]

Next, the timing adjustment in present Embodiment 1 will be described. Terminal 100 performs the timing adjustment with one or more timing adjustment values.

By way of example, two types of timing adjustment are performed: relatively fine granularity timing adjustment and relatively coarse granularity timing adjustment.

In the relatively fine granularity timing adjustment, terminal 100 performs transmission timing adjustment in units of sample. The units of sample may be, for example, basic sample time Tc (=0.509 ns) as described in section 4.1 of TS38.211 V15.8.0. For example, the transmission timings are adjusted for reception by base station 200 within the CP length of a PUSCH OFDM symbol or the CP length of a PRACH symbol. In the relatively coarse granularity timing adjustment, terminal 100 performs the transmission timing adjustment in units of slot and/or OFDM symbol. The time units for the coarse timing adjustment may be an integer multiple of basic sample time Tc, or may be a time length of 1 μs or 1 ms. For example, the transmission timings are adjusted for reception by base station 200 in a slot or OFDM symbol assumed by base station 200.

The timing adjustment value for performing fine granularity adjustment is, for example, the following values:

Timing adjustment value based on location information calculated by the terminal;

Timing adjustment value based on first path tracking calculated by the terminal; and Timing adjustment value based on TA command 1 transmitted by the base station (fine TA command).

The timing adjustment value for performing coarse granularity adjustment is, for example, the following values:

Cell-specific timing adjustment value (cell-specific TA offset) broadcast by the base station;

Terminal-specific timing adjustment ($K_{adj,UE}$) notified by the base station; and Timing adjustment value based on TA command 2 transmitted by the base station (coarse TA command).

Of the timing adjustment values described above, the timing adjustment value which is calculated by the terminal based on the first path tracking will be described in Embodiment 2.

Next, an example of timing control using the above-described timing adjustment values will be described.

Figure 8:
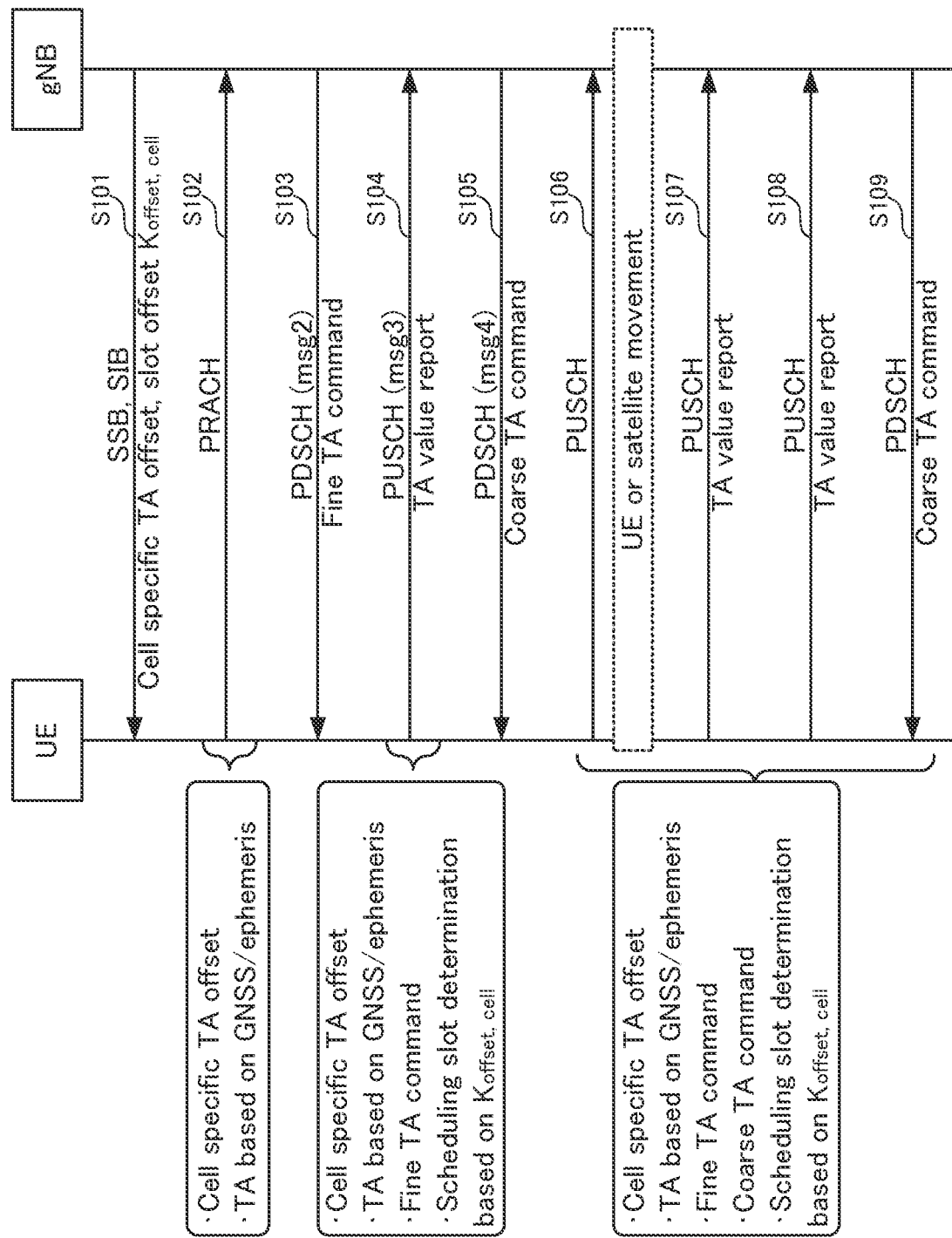
FIG. 8 illustrates one example of a sequence chart relating to timing control in Embodiment 1.

FIG. 8 is a diagram illustrating an example of a sequence chart relating to timing control in present Embodiment 1. FIG. 8 illustrates an example of signals (or channels used for transmission and reception of signals) transmitted and received between terminal 100 (UE) and base station 200 (gNB), and timing adjustment values used by the UE for signal transmission. Hereinafter, the processes of step 101 (S101) to S109 in FIG. 8 will be described.

<S101>

The base station (gNB) transmits an SSB and a System Information Block (SIB). The SSB and SIB may be transmitted periodically. The SSB includes a synchronization signal and cell-specific basic control information (e.g., Master Information Block). The SIB also includes cell-specific information for the terminal to access the base station. The SIB may also include information indicating the locations of satellites (e.g., satellite ephemeris). The SIB includes a cell-specific TA offset and a slot offset ($K_{offset,cell}$) indicating the slot position for data allocation.

<S102>

The terminal receives the SSB and the SIB and transmits a PRACH for initial access. Here, the terminal adjusts a PRACH transmission timing. For example, the terminal performs timing adjustment by using the value of the cell-specific TA offset broadcast by the base station and the timing adjustment value based on the location information calculated by the terminal. The timing adjustment value based on the location information is a terminal-specific adjustment value, and may be described as "TA based on GNSS/ephemeris" or "GNSS/ephemeris based TA."

Here, an example of calculation of the timing adjustment value based on the location information will be described. The terminal obtains the location information of the terminal using the GNSS function or the like. The terminal calculates the distance between each satellite and the terminal from the location information of the satellite held or notified and the location information of the terminal. Then, the terminal calculates one-way propagation delay time by dividing the calculated distance by the radio wave propagation speed (e.g., $3\times10^8$ [m/s]). The time twice as long as the calculated propagation delay time corresponds to the round-trip propagation delay time (Round Trip Time: RTT). The calculated round-trip propagation delay time is the timing adjustment value based on the location information. The timing adjustment value based on the location information may be a value obtained by adding processing delay time of the terminal and/or the base station to the calculated round-trip propagation delay time.

The value obtained by adding the cell specific TA offset value broadcast by the base station to the timing adjustment value based on the location information is the TA value.

For example, the terminal uses Equations 1, 2, and 3 to determine value $TA_{final}$ to be used for timing adjustment. Note that, $TA_{final}$ determined by Equation 1, $TA_{NTN\_offset}$ determined by Equation 2, and $TA_{coarse}$ determined by Equation 3 may be, for example, in units of ns (nano second).

[1]

$$TA_{final}=(N_{TA}+N_{TAoffset})\times T_c+TA_{NTN\_offset} \quad \text{(Equation 1)}$$

$$TA_{NTN\_offset}=TA_{location}+TA_{coarse} \quad \text{(Equation 2)}$$

$$TA_{coarse}=(M_{offset,cell}+M_{coarse})\times 10^6/2^\mu \quad \text{(Equation 3)}$$

The first term on the right side of Equation 1 is the same as in the Rel. 15 NR specifications. As described in section 4.1 of TS38.211 V15.8.0, Tc=0.509 ns, and "$N_{TA}$" is a correction value in accordance with the TA command transmitted by the base station. For example, in the case of PRACH transmission, $N_{TA}$ is zero. $N_{TAoffset}$ is an offset value for use in timing adjustment or the like between different base stations. $TA_{final}$, which is a TA value calculated by Equation 1, is, for example, the same as $T_{TA}$ described in Section 4.3.1 of TS38.211 V15.8.0, and is obtained by adding correction term $TA_{NTN\_offset}$ for the NTN expressed by Equation 2 to the first term of Equation 1 the same as in the Rel. 15 NR specifications. Since Rel. 15 NR specifications can be reused, extension to NTN can be achieved with a small change.

$TA_{location}$ represents the round trip propagation delay time calculated based on the location information. For example, $TA_{location}$ may be expressed in ns.

The term, $10^6/2^\mu$, of Equation 3 represents the slot length in the case of parameter $\mu$ representing the subcarrier spacing, and for example, may be expressed in units of ns. For example, parameters $\mu$ representing the subcarrier spacing are defined as $\mu$=0, 1, 2, 3, and 4 respectively for subcarrier spacings 15 kHz, 30 kHz, 60 kHz, 120 kHz, and 240 kHz. The term, $10^6 2^\mu$, is a kind of scaling value and may be another value.

$M_{offset,cell}$ is the cell-specific TA offset. The cell-specific TA offset indicates, for example, the number of slots to be shifted. $M_{coarse}$ is a below-described offset and is zero at the time of PRACH transmission. These offsets may indicate time to be offset (for example, in units of ms), instead of the number of slots. Note that, in the case of offsets indicating the time, the offsets do not have to be multiplied by the term, $10^6/2^\mu$, representing the slot length, or may be multiplied or divided by another factor.

In Equation 1, the correction term, $TA_{NTN\_offset}$, can be normalized by Tc and expressed as given in following Equation 4:

[2]

$$TA_{final}=(N_{TA}+N_{TAoffset}+N_{TA\_NTN\_offset})\times T_c \quad \text{(Equation 4)}.$$

Further, as illustrated in above Equation 2, $TA_{NTN\_offset}$ includes timing adjustment value $TA_{location}$ based on the location information and timing adjustment value $TA_{coarse}$ based on the cell-specific offset and/or coarse offset notified by the base station, but the present disclosure is not limited to this. For example, timing adjustment value $TA_{location}$ based on the location information may be included in $N_{TA}$, and $TA_{NTN\_offset}$ may include only the timing adjustment value based on the cell-specific offset and/or coarse offset notified by the base station.

The terminal transmits an uplink signal at a timing earlier by the above TA value ($TA_{final}$) than a downlink reference reception timing of the SSB or the like.

Figure 9:
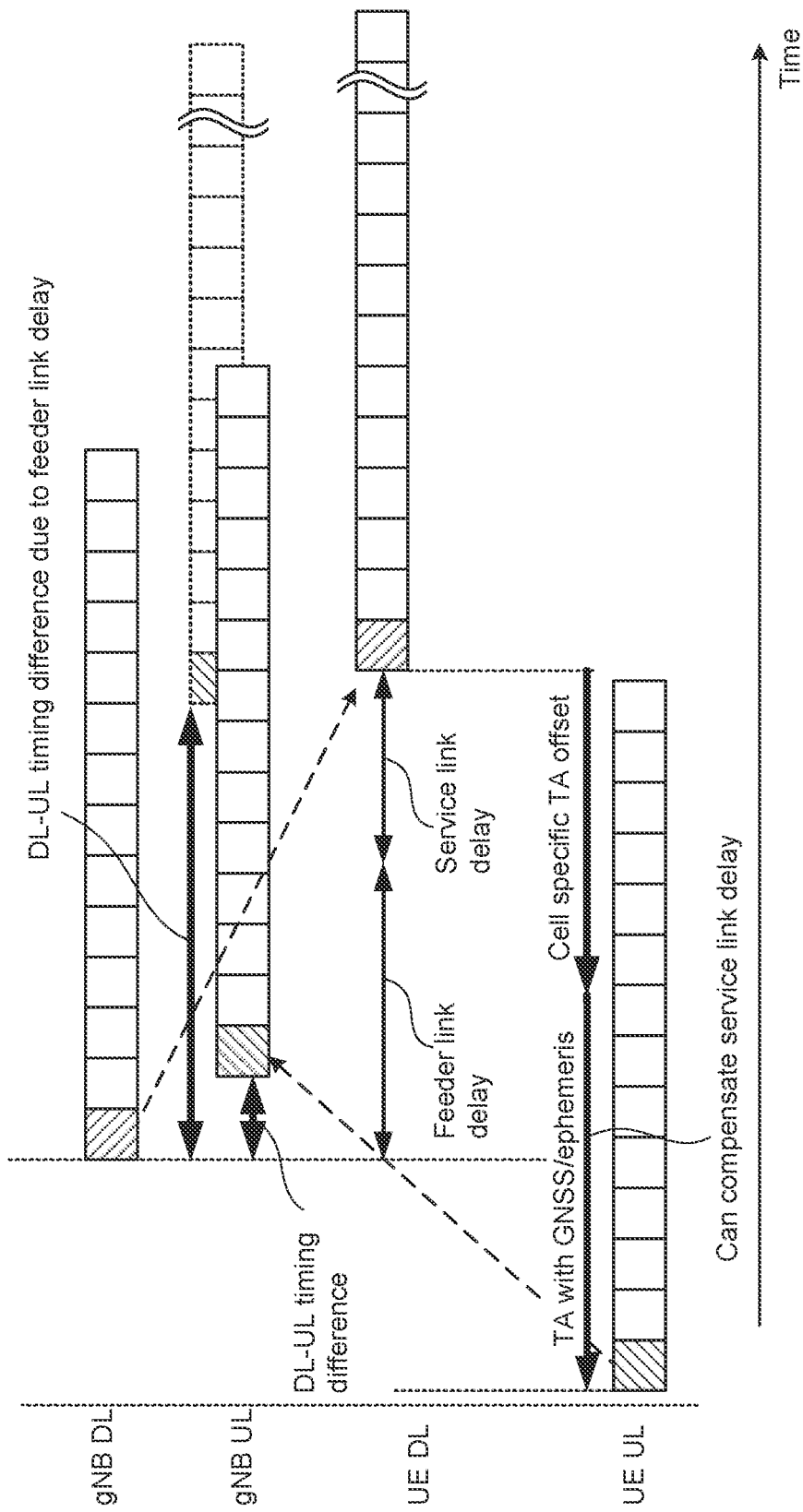
FIG. 9 illustrates one example of timing adjustment using a cell-specific TA offset value and a timing adjustment value based on location information.

FIG. 9 is a diagram illustrating one example of timing adjustment using the cell-specific TA offset value and the timing adjustment value based on the location information.

FIG. 9 illustrates DL transmission slots and UL reception slots for the base station (gNB), and, DL reception slots and UL transmission slots for the terminal (UE). Note that, the horizontal axis of FIG. 9 represents the time axis.

FIG. 9 illustrates one example of the uplink signal transmitted at a transmission timing earlier by the TA value than the downlink reference reception timing. The TA value in FIG. 9 is expressed by the sum of the cell-specific offset value and the timing adjustment value based on the location information.

In addition, "DL-UL timing difference due to feeder link delay" in FIG. 9 indicates a DL-UL timing difference caused by a feeder link delay that occurs when no cell-specific offset value is used.

By using the cell-specific TA offset value, the base station can reduce the DL-UL timing difference caused, for example, by the feeder link delay.

A DL-UL timing difference of several hundred milliseconds may occur due to a round-trip propagation delay in satellite communication. Depending on the implementation of the base station, it is difficult to manage the DL-UL timing difference. As described above, by using the cell-specific TA offset, the DL-UL timing difference can be controlled to a manageable extent (e.g., within 10 ms) by the base station. Here, in the case of a non-geostationary satellite such as LEO, the propagation delay of the feeder link changes depending on the location of the non-geostationary satellite changing with time. Therefore, a cell-specific TA offset value that corrects the shortest delay amount of the feeder link delay time may be used. It is only necessary to correct the DL-UL timing difference to the extent that the timing difference can be easily managed by the base station. It is thus possible to suppress the increase in notification overhead and cope with the long delay environment of the satellite communication such as the NTN environment by notifying the terminal of the coarse granularity value, for example, in units of slot or in units of OFDM symbol.

The information (e.g., SIB) broadcast by the base station may include a Timing drift rate of the propagation delay time in the feeder link. The terminal may calculate the TA offset (that is, $TA_{NTN\_offset}$) at the current time from the cell-specific TA offset and the timing drift rate broadcast by the base station.

<S103>

The base station receives the PRACH and detects a difference between a base station reference timing and a PRACH reception timing. The base station determines TA command 1 (Fine TA command in FIG. 8) for correcting the timing corresponding to the detected difference, and transmits a PDSCH including determined TA command 1. TA command 1 may be, for example, a TA command the same as in Rel. 15 NR. A response in S103 to the terminal including TA command 1 may also be referred to as a RACH response (RAR).

The CP length of the PRACH is configured to be longer than the CP length of a PUSCH. Therefore, even when the PRACH is received within the CP length of the PRACH, the reception timing of reception by the base station for the PUSCH transmitted by the terminal after the PRACH may be outside the CP length. In this step, the base station transmits TA command 1 and controls the terminal transmission timing to fall within the CP length of the PUSCH.

<S104>

The terminal transmits the PUSCH in time-frequency resources designated in the RAR. A time resource is a slot corresponding to the slot number that is offset by $K_{offset,cell}$ notified with the SIB from the base station, and the terminal performs transmission at such a timing that the base station performs reception in the slot with this slot number. At this time, the terminal further adjusts the timing in accordance with notified TA command 1 from the timing of the PRACH transmission. For example, the timing adjustment is performed using $TA_{final}$ determined using the value of TA command 1 as $N_{TA}$ in Equation 1, and the PUSCH is transmitted.

Further, the terminal may notify the base station of the timing information (TA value report in FIG. 8). For example, the terminal may notify $TA_{final}$ determined using Equation 1 or may notify $TA_{NTN\_offset}$ or $TA_{location}$ unknown to the base station. In both cases, the value is rounded into a coarse granularity value, such as a value in units of slot length or in units of OFDM symbol length, and notified. For example, round and/or floor operations may be used to convert the value into the coarse granularity value. This notification is used by the base station for controlling allocation of slots for the PUSCH and/or HARQ-ACK, and may thus be coarse granularity notification, e.g., in units of slot. The coarse granularity notification can reduce notification overhead. Further, the timing information notified by the terminal to the base station may be information expressing, for example, using a relative value to a value notified in an entire cell by broadcast information, $TA_{final}$, $TA_{NTN\_offset}$, $TA_{location}$, or a normalized value thereof by the slot length. For example, the value notified in the entire cell by the broadcast information may be cell-specific $K_{offset,cell}$ indicating the transmission timing for the PUSCH or HARQ-ACK with respect to the timing of the DCI or PDSCH. Further, the terminal may notify information expressed by a relative value indicative of how earlier the timing (e.g., a slot) available for transmission of the PUSCH or HARQ-ACK is from the cell-specific timing configured by $K_{offset,cell}$. The notification overhead can be reduced by expressing the information notified by the terminal by using relative values. In addition, the propagation delay amount changes according to the movement of the satellite, and accordingly, the transmission timing for the terminal is also changed. Thus, the change rates of the propagation delay amount and the transmission timing, for example, the time (e.g., the number of slots) taken for a change in timing by one slot length may be notified together. Thus, the base station can calculate the timing change for each terminal caused by the movement of the satellite. It is thus possible to appropriately control timing offset value $K_{adj,UE}$ for each terminal to be described later. Further, the terminal may notify the location information obtained by the GNSS as an alternative to $TA_{location}$, or may notify both $TA_{location}$ and the location information. In order that a calculation error of the propagation delay be equal to or less than a predetermined value, the location information to be notified may be location information having a granularity of, for example, about 1 km, or location information in which values below the decimal point of latitude and longitude are limited. For example, the location information to be notified may have granularity depending on the slot length (or subcarrier spacing) such that the calculation error of the propagation delay is equal to or less than the slot length. The location information may be reused as information for use in band-over control or the like.

<S105>

The base station transmits information for contention resolution in random access and/or RRC configuration information using a PDSCH. For example, the base station transmits a MAC CE including TA command 2 (Coarse TA command in FIG. 8). TA command 2 is, for example, a timing adjustment command of a granularity in units of slot. The base station configures TA command 2 based on the information on the TA value notified by the terminal in S104.

For example, the larger the TA value notified by the terminal to the base station, the longer the propagation delay. Therefore, the base station may configure, to a smaller value, TA command 2 to be notified to the terminal. In this case, the slots of the PUSCH and/or HARQ-ACK allocated in accordance with the DCI are slots later in timing, that is, slots with larger slot numbers. The terminal can transmit the PUSCH or HARQ-ACK after adequate transmission preparation time after reception of the DCI or PDSCH.

On the other hand, the smaller the TA value notified by the terminal, the shorter the propagation delay. Thus, TA command 2 may have a larger value. In this case, the slots of the PUSCH and/or HARQ-ACK are slots earlier in timing, that is, slots with smaller slot numbers. When the propagation delay is relatively short, and even when the timing is adjusted with TA command 2 to an earlier timing, the terminal can transmit the PUSCH or HARQ-ACK after adequate transmission preparation time after reception of the DCI or PDSCH. For example, when $K_{offset,cell}$ is configured correspondingly to the propagation delay occurring at a terminal located the farthest from the satellite in the cell, TA command 2 notified to the terminal located the farthest from the satellite may be configured to 0. In this case, a terminal located closer to the satellite may be notified of TA command 2 having a larger value. Such a control allows transmission with a lower delay for terminals closer to the satellite.

When the location information is notified by the terminal in S104, the base station may estimate the TA value of the terminal based on the notified location information, and may configure TA command 2 in the same manner as described above.

In addition, TA command 2 included in RRC configuration information may be transmitted.

<S106>

In timing adjustment for subsequent PUSCH and HARQ-ACK transmissions, the terminal uses the TA value ($TA_{final}$ of Equation 1) determined by configuring $M_{coarse}$ of Equation 2 to the value notified by TA command 2.

Figure 10:
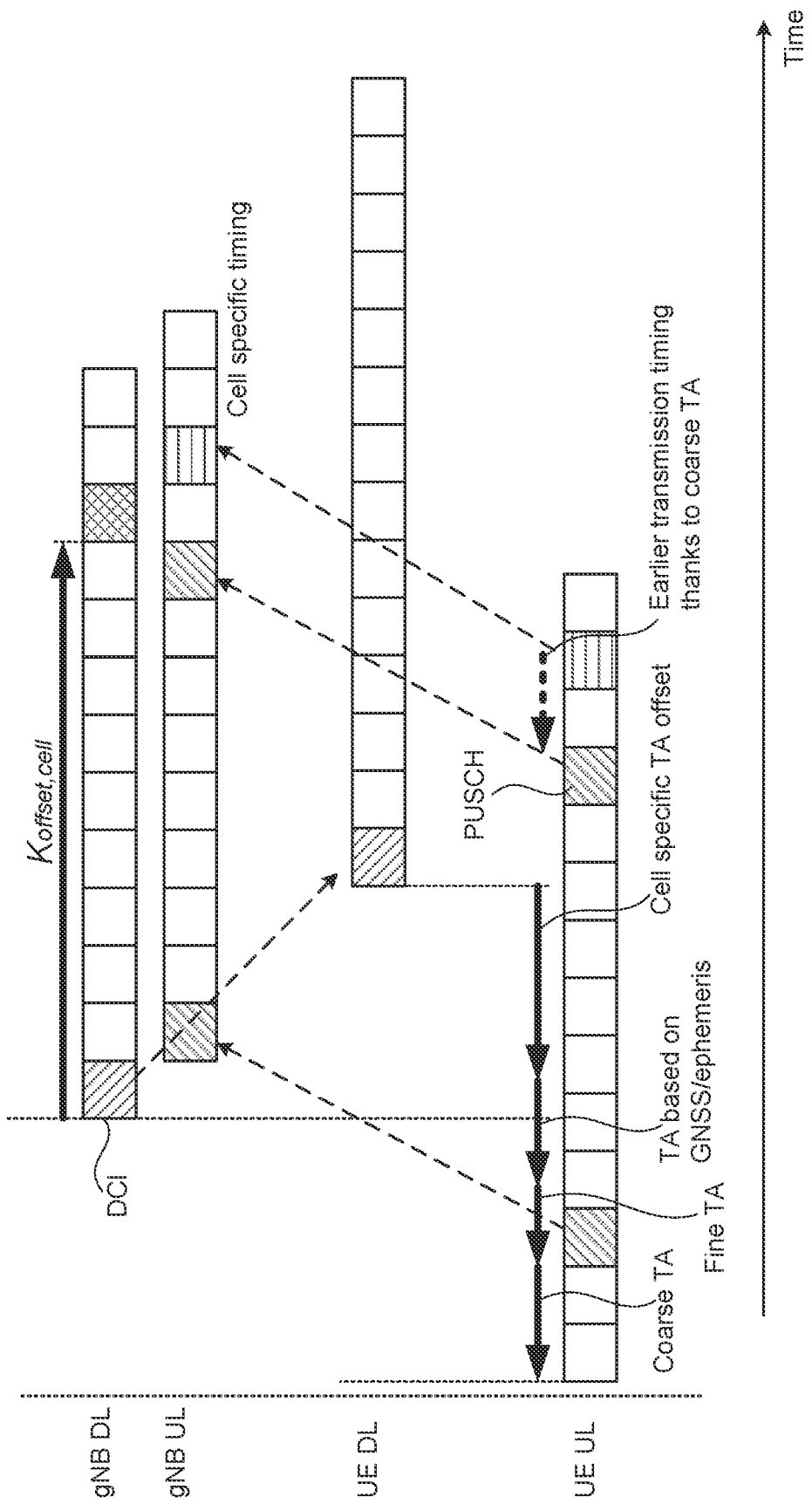
FIG. 10 illustrates one example of timing adjustment using each TA including TA command 2.

FIG. 10 is a diagram illustrating one example of timing adjustment using each TA including TA command 2.

FIG. 10 illustrates DL transmission slots and UL reception slots for the base station (gNB), and DL reception slots and UL transmission slots for the terminal (UE). Note that, the horizontal axis of FIG. 10 represents the time axis.

The "Coarse TA" in FIG. 10 denotes a TA notified by TA command 2. The "Fine TA" in FIG. 10 denotes a TA notified by TA command 1. The "TA based on GNSS/ephemeris" and "Cell specific TA offset" in FIG. 10 may be similar to "TA based on GNSS/ephemeris" and "Cell specific TA offset" illustrated in FIG. 9, respectively.

Further, "Cell specific timing" in FIG. 10 is a timing of PUSCH reception by the base station assumed in the case of transmission without using TA command 2, such as transmission of the above-described MSG3. For example, in consideration of the round-trip propagation delay time of the terminal the farthest from the satellite in a certain cell, a timing at which even the terminal the farthest from the satellite can perform transmission is configured. On the other hand, since the timing is in accordance with the farthest terminal, an excessive delay occurs for the terminal close to the satellite. As illustrated in FIG. 10, by using the coarse TA notified by TA command 2, it is possible to make it earlier the PUSCH transmission and reception timings than the Cell specific timings.

Here, $M_{coarse}$ of Equation 2 may be converted by the granularity of TA command 2. For example, when the granularity is in units of OFDM symbol, the value notified by TA command 2 (the value in units of slot) may be divided by 14 (the number of OFDM symbols per slot) to be converted into a value in units of OFDM symbol.

<S107 and S108>

When the satellite and/or the terminal move by a distance equal to or greater than a threshold of the movement distance, the terminal again calculates the propagation delay based on the GNSS location information and the location information from the satellite ephemeris, updates $TA_{location}$ of Equation 1, and performs uplink transmission. Note that the case of updating $TA_{location}$ is not limited to the case where the satellite and/or the terminal move by a distance equal to or greater than the threshold, and the update may be executed at a predetermined cycle, for example. Alternatively, updating $TA_{location}$ may be performed in the case where the satellite and/or the terminal move by a distance equal to or greater than the threshold, and also at a predetermined cycle.

Further, updating $TA_{location}$ may be performed based on the amount of change in a detection timing of detecting the first path of the received signal from the base station. Section 7 of TS38.133 V15.6.0 for the terrestrial network describes that a timing earlier by a TA value than a downlink timing (i.e., the timing of the first path of the received signal) is used as a reference timing, and a transmission timing is adjusted so that a timing error, which is a difference between the reference timing and the transmission timing, does not exceed predetermined value $T_e$. In the NTN, the downlink timing changes with the movement of the satellite. Thus, the reference timing changes. Therefore, in the present method, $TA_{location}$ is updated so that the difference between the reference timing and the transmission timing does not exceed the predetermined value ($T_e$), and is transmitted at the transmission timing using the updated TA value. As with the terrestrial network, the terminal updates $TA_{location}$ such that the timing error does not exceed the predetermined value ($T_e$). Accordingly, the amount of change in the reception timing from the terminal as observed by the base station is less than a predetermined value. Thus, the base station reception processing is similar to that of the terrestrial network, and sharing and simplification of apparatuses of the base station can be achieved.

The frequency and cycle of the update of $TA_{location}$, or the threshold of the movement distance may be notified by the base station. Instead of the threshold of the movement distance, the amount of change in the TA value accompanying the movement may be notified. Further, predetermined values may be used for the frequency and cycle of the update of $TA_{location}$, or the threshold of the movement distance.

When the round-trip propagation delay changes by a predetermined value (for example, a time corresponding to ½ slots) or by a value greater than the predetermined value, the terminal may notify the base station of information on the corrected timing value and/or location information as in S104. When the round-trip propagation delay amount does not change by a predetermined value or by a value greater than the predetermined value, the terminal may transmit the user data without notifying the information on the corrected timing value information and/or location information. Here, for example, in the case of notifying the location information of the terminal, even when the propagation delay amount changes due to the movement of the satellite, the base station can grasp, based on the previously notified location information of the terminal, the amount of change in TA for an unmoving terminal or a terminal moving by a movement amount equal to or less than the threshold. Therefore, frequent notification of the location information of the terminal can be avoided, and the overhead of notification of the location information can be reduced.

<S109>

When the round-trip propagation delay of the terminal changes by a predetermined value or by a value greater than the predetermined value (e.g., by one or more slots), the base station transmits TA command 2 to change an allocated slot for the PUSCH and/or HARQ-ACK of the terminal.

As is understood from the sequence chart described above, the terminal performs two timing adjustments: relatively fine granularity timing adjustment and relatively coarse granularity timing adjustment. The terminal also performs the different timing adjustments depending on the channel and/or the signal to be transmitted.

Note that, in the above-described sequence diagram, the information notified by the base station to the terminal is one example, and the present disclosure is not limited to this. For example, the information notified by TA command 2 in above S105 and S109 may be notified by the offset value ($K_{adj,UE}$) with respect to the allocated slot instead of the TA command. The offset value ($K_{adj,UE}$) is, for example, a terminal-specific timing adjustment value.

In the case of notification by the offset value ($K_{adj,UE}$), $M_{coarse}$ of Equation 2 does not have to be used or may be configured to zero. In addition, in the case of notification by the offset value ($K_{adj,UE}$), the terminal interprets the allocated slot for the PUSCH as "$n+K_2+K_{offset,cell}-K_{adj,UE}$." Here, "n" is the slot in which the DCI for assigning the PUSCH is transmitted, and "$K_2$" is the value to be notified by the DCI. For example, as $K_2$, the time required to prepare for PUSCH transmission after DCI reception and/or the time to the next available uplink slot are configured. The offset value ($K_{adj,UE}$) may be negative. The offset value ($K_{adj,UE}$) may also be expressed by a relative value relative to $K_{offset,cell}$. The offset value ($K_{adj,UE}$) may be used not only to allocate the PUSCH but also to notify the slot of HARQ-ACK for a PDSCH. Further, the base station may notify the terminal of value $K_{offset,UE}$ corresponding to ($K_{offset,cell}-K_{adj,UE}$), and the terminal may use $K_{offset,UE}$ notified by the base station instead of $K_{offset,cell}$.

Figure 11:
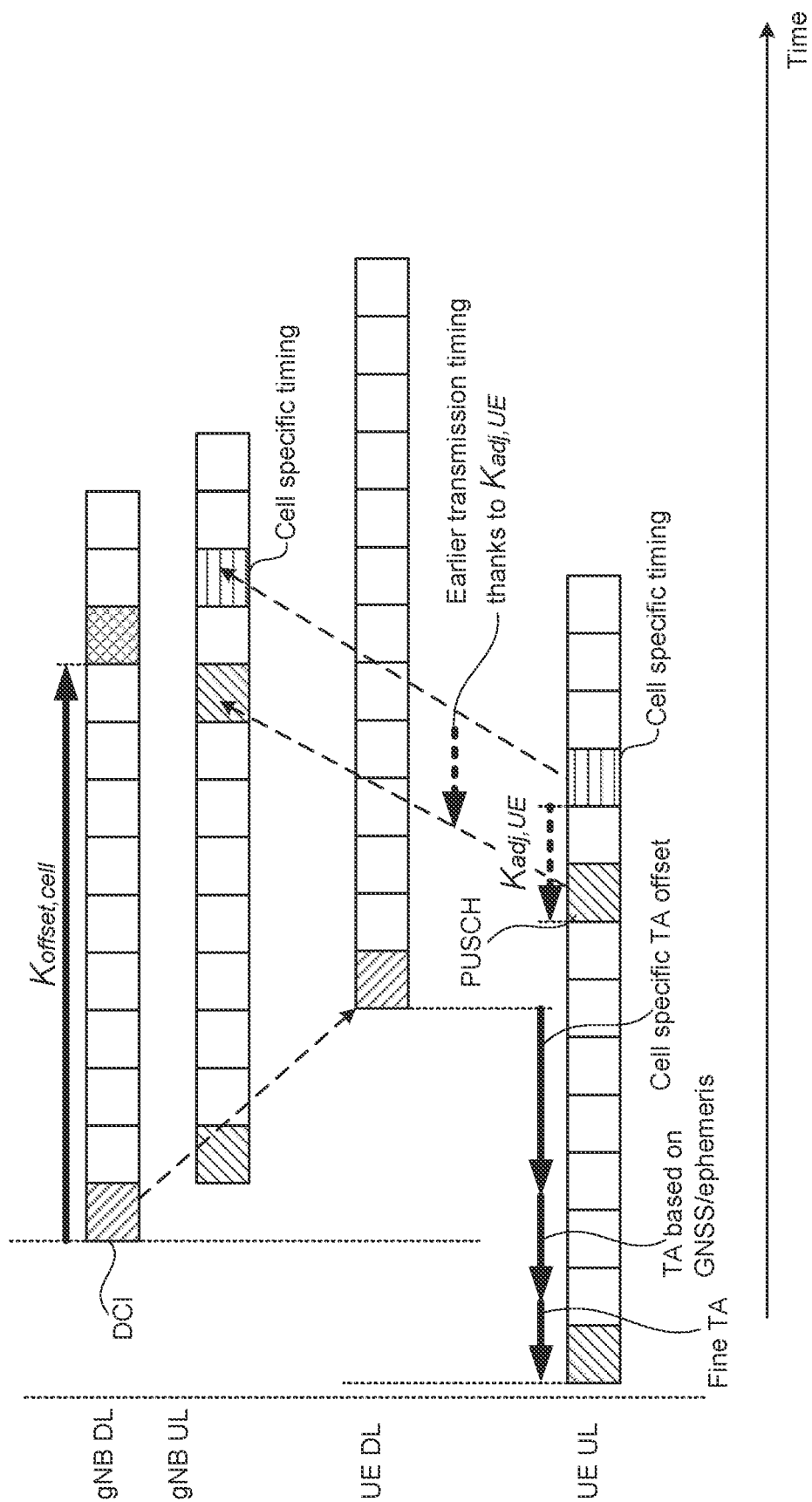
FIG. 11 illustrates one example of timing adjustment using information including $K_{adj,UE}$.

FIG. 11 illustrates one example of timing adjustment using information including $K_{adj,UE}$.

FIG. 11 illustrates DL transmission slots and UL reception slots for the base station (gNB), and DL reception slots and UL transmission slots for the terminal (UE). Note that, the horizontal axis of FIG. 11 represents the time axis.

In FIG. 11, the terminal determines, as an allocation slot for the PUSCH, the slot that is shifted by the offset value of $K_{adj,UE}$ from the slot that is the "Cell specific timing."

Although FIG. 11 illustrates an example in which the offset value of $K_{adj,UE}$ is used in determining the allocation slot for the PUSCH, the present disclosure is not limited to this. For example, the offset value of $K_{adj,UE}$ may be applied in determining the transmission slots for HARQ-ACK transmission and/or SRS. When the offset value is applied to the HARQ-ACK transmission, "n" may be a target PDSCH slot for HARQ-ACK. Also, when the offset value is applied to the SRS transmission, "n" may be a DCI slot indicating the SRS transmission. Since the information indicating the offset from $K_{offset,cell}$ is notified instead of the TA command, the amount of information to be notified can be reduced. The granularity of the notified offset may be in units of slot or in units of OFDM symbol. The units of OFDM symbol allow a finer timing control. The offset value of $K_{adj,UE}$ does not have to be applied depending on channels and/or signals, or other offset values may be used.

As described above, in present Embodiment 1, the coarse granularity timing control is performed in addition to the fine granularity timing control. It is thus possible to suppress an increase in notification overhead, and to perform transmission timing control on transmission by the terminal that is suitable for a satellite communication environment suffering from a long propagation delay and a large propagation delay difference between terminals.

Embodiment 2

In present Embodiment 2, timing adjustment by path tracking is performed.

[Configuration of Terminal]

The configuration of the terminal according to Embodiment 2 may be the same as that of terminal 100 illustrated in present Embodiment 1. However, additional processing is performed in timing adjuster 104 of terminal 100 illustrated in Embodiment 1.

Timing adjuster 104 tracks the reception timing of the SSB, PDCCH, PDSCH, or Tracking RS (TRS) received by radio receiver 107, and calculates a timing adjustment value corresponding to the amount of change in the reception timing. When a plurality of paths (e.g., delayed waves) are detected, the reception timing to be tracked may be the timing of the first path. Then, timing adjuster 104 performs timing adjustment using any one or more calculated timing adjustment values according to the path tracking and the timing adjustment value illustrated in Embodiment 1.

[Example of Timing Adjustment]

Next, timing adjustment in present Embodiment 2 will be described.

For example, the terminal uses Equations 5 and 6 to determine value $TA_{final}$ to be used for timing adjustment. $TA_{final}$ determined by Equation 5 may be, for example, in units of ns (nano second).

[3]

$$TA_{final}=(N_{TA}+N_{TAoffset})\times T_c+TA_{NTN\_offset} \quad \text{(Equation 5)}$$

$$TA_{NTN\_offset}=TA_{location}+TA_{path}+TA_{coarse} \quad \text{(Equation 6)}$$

In Equations 5 and 6, the same parameters as those of Equations 1, 2, and 3 will not be described. Equation 5 is similar to Equation 1, but the second term on the right side is represented by Equation 6. The right side of Equation 6 includes $TA_{path}$ in addition to the parameters on the right side of Equation 2. $TA_{path}$ is a value for timing adjustment based on path tracking.

The terminal may selectively use the case of performing the timing adjustment based on the location information and the case of performing the timing adjustment by path tracking in addition to the timing adjustment based on the location information depending on an uplink transmission channel and/or transmission timing of the terminal. For example, in the case where the timing adjustment based on the location information is performed (in other words, the case where the timing adjustment is not performed by path tracking), $TA_{path}$ may be configured to zero. Which of the two cases to use may be indicated to the terminal in control information from the base station. Alternatively, a rule may be defined in advance, and the terminal may selectively use the cases in accordance with the prescribed rule.

For example, examples of application of the two cases are described below.

The case where the timing adjustment based on the location information is performed, that is, the case where the timing adjustment by the path tracking is not performed is, for example, the following cases:

PRACH transmission;
SRS transmission;
First transmission after waking up from a DRX sleep period (long sleep and/or short sleep);
First transmission after expiration of a TA validity timer; and
Transmission in an IDLE or INACTIVE status.

Further, the case of performing the timing adjustment based on the location information and the timing adjustment by the path tracking is, for example, the following cases:

RRC_CONNECTED state; and
Second transmission or later transmissions after waking up from sleep.

Next, an example of timing control using the above-described timing adjustment values will be described.

Figure 12:
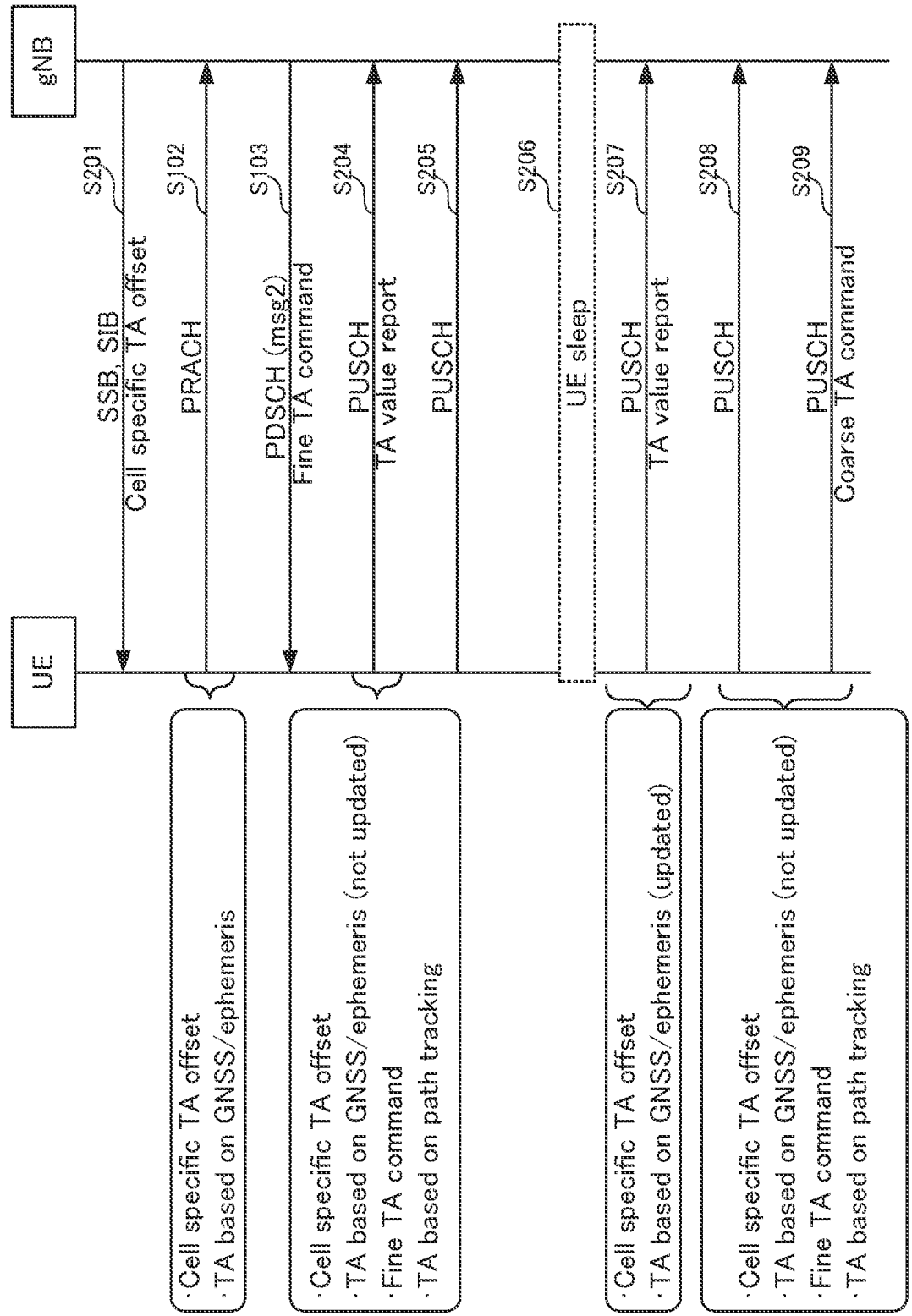
FIG. 12 illustrates one example of a sequence chart relating to timing control in Embodiment 2.

FIG. 12 is a diagram illustrating an example of a sequence chart relating to timing control in present Embodiment 2. Like FIG. 8, FIG. 12 illustrates an example of signals (or channels used for transmission and reception of signals) transmitted and received between terminal 100 (UE) and base station 200 (gNB), and timing adjustment values used by the UE for signal transmission. Note that, identical processes between FIG. 8 and FIG. 12 are provided with the same reference numerals and descriptions of such processes may be omitted.

<S201>

The base station (gNB) transmits the SSB and the SIB. The SSB and SIB may be transmitted periodically. The SSB includes a signal for synchronization and basic cell-specific control information. The SIB also includes cell-specific information for the terminal to access the base station. The SIB may also include information indicating the locations of satellites (e.g., satellite ephemeris). The SIB includes a Cell specific TA offset.

<S204 and S205>

The terminal stores the SSB reception timing (first path timing) during calculation of timing adjustment value $TA_{location}$ based on the location information at the time of PRACH transmission (S102 in FIG. 12). Then, the terminal receives the SSB, PDCCH, or PDSCH at certain intervals, to monitor the change in the timing of the first path. When there is a certain extent of change, the terminal changes (updates) the transmission timing. When the path timing change amount is denoted by $\Delta_{path}$, the terminal determines that $TA_{path}=2\times\Delta_{path}$. Using each of the timing adjustment values including $TA_{path}$, the terminal determines $TA_{final}$ in Equation 3, performs the timing adjustment using determined $TA_{final}$, and transmits the PUSCH.

In addition, the terminal may update the timing when the amount of change in the reception timing of the path is equal to or greater than a threshold. The interval at which the TA value is updated and/or the threshold of the amount of change that determines whether or not the TA value is updated may be designated by the base station, or may be determined in advance.

As in Embodiment 1, the terminal notifies the base station of the timing information (for example, at least one of the TA value and the location information) (TA value report in FIG. 12). For example, the terminal may notify the sum of $TA_{location}$ and $TA_{path}$. Alternatively, in the same manner as in Embodiment 1, the terminal may round the timing information into a coarse granularity value such as a value in units of slot length or in units of OFDM symbol length, and may notify the coarse granularity value.

The terminal sleeps when there is no data to communicate. For the sleep operation, the DRX operation the same as in Rel. 15 NR described in TS38.321 may be performed. Note that the sleep of the terminal is not limited to the sleep of communication when there is no data to communicate, and for example, may be replaced with the sleep of the CPU operation.

<S206>

The terminal obtains the location information of the terminal in the first transmission (for example, PUSCH transmission) after waking up from sleep. When the location of the satellite changes, the terminal uses the changed location information of the satellite. The terminal then updates $TA_{location}$, performs timing adjustment, and transmits the PUSCH. Here, the terminal configures $TA_{path}$ to zero (resets or clears $TA_{path}$).

<S207>

After waking up from sleep, the terminal may notify the base station of timing information (e.g., a TA value) since it is highly likely that the location of the satellite or terminal has changed. Whether or not the timing information is notified to the base station may be designated by the base station (notified with the SIB) depending on the type of satellite (geostationary satellite, non-geostationary satellite) or the like; or may be configured or notified for each terminal depending on the moving speed, the type of the terminal, and/or the like.

<S208 and S209>

As in S204 and S205, the terminal updates $TA_{path}$ by path tracking. Here, the terminal does not have to update $TA_{location}$.

As is understood from the sequence chart described above, the terminal performs two timing adjustments: relatively fine granularity timing adjustment and relatively coarse granularity timing adjustment. The terminal also makes different timing adjustments depending on the channel and/or the signal to be transmitted. The terminal determines $TA_{path}$ by path tracking, and performs the timing adjustment using the timing adjustment values including $TA_{path}$.

Although the example has been described in which the terminal sleeps in S206 and wakes up in S207, the present disclosure is not limited to this example. For example, the same applies to the return from IDLE or INACTIVE, or the return from the expiration of the TA timer. The TA timer may be timeAlignmentTimer as described in TS38.321 V15.8.0.

In the sequence chart described above, as in Embodiment 1, $K_{offset,cell}$, $K_{adj,UE}$ and TA command 2 (coarse TA) may be used or do not have to be used, or predetermined values may be used. The base station may explicitly notify disablement or may notify the predetermined values.

As described above, in present Embodiment 2, by performing the coarse granularity timing control in addition to the fine granularity timing control, it is possible to suppress an increase in overhead of notification, and perform transmission timing control of the terminal suitable for a satellite communication environment suffering from a long propagation delay and a large propagation delay difference between terminals. Further, in present Embodiment 2, in the timing control, by using the timing adjustment value based on the path tracking, it is possible to perform an appropriate terminal transmission timing control.

In the case of the timing adjustment based on the location information on the locations of the terminal and satellite (e.g., GNSS/ephemeris location information), an error occurs with respect to actual propagation paths in the non line-of-sight environment (e.g., an environment where there is no direct wave and reflected or diffracted waves arrive). This error can be corrected by the TA command transmitted by the base station. However, when the timing adjustment based on the GNSS/ephemeris location information is performed again each time the location of the terminal or the satellite changes, the error occurs again and the correction based on the TA command is performed again.

To avoid this, correction by path tracking is performed without frequently repeating the timing adjustment based on the GNSS/ephemeris location information. Accordingly, timing control accuracy is maintained, and frequent TA command transmission from the base station can be avoided. In addition, the timing accuracy can be improved and the overhead can be reduced. Further, in the case where no signal is received for a long time, such as during sleep, and/or in the first transmission performed after some functions were stopped, it is highly likely that path tracking has not been performed. It is possible to maintain a certain degree of timing accuracy by performing the timing adjustment based on GNSS/ephemeris location information.

The embodiments of the present disclosure have been described above.

Note that the embodiments described above have been described by taking the NTN environment (e.g., a satellite communication environment) as an example, but the present disclosure is not limited thereto. The present disclosure may be applied to other communication environments (e.g., a terrestrial cellular environment in LTE and/or NR)

The expression "section" used in the above-described embodiments may also be "circuit (circuitry)," "device," "unit," or "module."

In addition, Embodiment 1 and Embodiment 2 may be used in combination.

Note that, although the above embodiments have been described in relation to the example in which the GNSS such as GPS (i.e., position detection using a satellite signal) is utilized, position detection by a terrestrial cellular base station, position detection using a WiFi signal and/or Bluetooth (registered trademark) signal, position detection using an acceleration sensor or the like, or a combination thereof may be performed. Further, the location information may include information on the altitude in addition to the latitude and longitude. Alternatively, the location information may be a value of a coordinate system defined separately. The altitude information may be obtained from a barometric pressure sensor or the like.

In the above embodiments, the terminal notifies the base station of at least one of the TA value and the location information, but the timing of the notification (trigger of the notification) may be different from that in the above embodiments. For example, the trigger of the notification may be based on another indicator, such as the amount of change in channel quality, instead of the amount of change in TA value or location. For example, a Reference Signal Received Power (RSRP), a Reference Signal Received Quality (RSRQ), a Signal to Interference plus Noise Ratio (SINR), or the like is used as the channel quality. The thresholds of the indices and amounts of change to be used may be configured by the base station.

In addition, the base station may indicate which information (e.g., the TA value or the location information) to notify.

Regarding the cell-specific TA offset, $K_{offset,cell}$, and the like, differences from a value indicated by the cell parameters (e.g., a value corresponding to the RTT in the vicinity of the cell center) may be notified. By notifying the differences, the amount of notification information can be reduced.

In the above-described embodiments, a Rel. 15 NR TA command without any change in the granularity and range may be utilized as TA command 1 for the fine granularity control. By using the TA command without any change in the granularity and range, it is possible to reduce the amount of change in implementation of the terminal and the base station. The granularity and range of TA command 2 may be notified by the base station with the SIB or the like. This makes it possible to achieve the notification of TA command 2 with an appropriate number of bits (e.g., a minimum number of bits) depending on the cell size, the satellite altitude, and the like, so as to reduce the notification overhead. In addition, the granularity and range of $K_{offset}$ and $K_{adj,UE}$ may also be notified by the base station with the SIB or the like.

TA command 1 may be expressed by a relative value to TA command 1 transmitted in the immediately preceding transmission timing, or by a control value with respect to the TA value transmitted in the immediately preceding transmission timing. In this case, the accumulated value of previously received TA commands 1 is used as $N_{TA}$ of Equation 1. Further, TA command 2 may be expressed by a relative value to TA command 2 transmitted in the immediately preceding transmission timing, or by a control value with respect to the TA value transmitted in the immediately preceding transmission timing. In this case, the accumulated value of previously received TA commands 2 is used as $M_{coarse}$ of Equation 2.

The cell-specific TA offset and/or $K_{offset,cell}$ may be a value associated with the SSB per beam. In this case, the amount of information to be notified may be reduced by notifying a difference from a value notified on a cell-by-cell basis. This may also be referred to as "common TA offset" or "Common timing offset."

The signals and/or information broadcast by the base station may be transmitted in the SSB and/or the SIB, or may be transmitted in a method that allows a plurality of terminals to receive the SSB and/or the SIB (e.g., using a group-common DCI format (DCI format 2_x or the like)). Further, TA command 1 and/or TA command 2 may be transmitted with the group-common DCI format (DCI format 2_x or the like) when the same timing adjustment value is to be used for a plurality of terminals by collectively notifying TA command 1 and/or TA command 2 to the plurality of terminals.

In the above embodiments, two types of timing adjustment values having different granularities and ranges are used, but the timing adjustment values may have the same the granularity and range or one of the granularity and range may be different between the timing adjustment values. In addition, three or more types of timing adjustment values having different granularities and ranges may be used. The cell-specific TA offset may be used for applications other than those described above. For example, the fine granularity adjustment value may be used as an offset value added to absorb errors in terminal location information and/or satellite location information. $TA_{NTN\_offset}$ may also include a fine granularity adjustment element and a coarse granularity adjustment element.

Further, a timing adjustment value with a granularity as fine as that of the TA command control in Rel. 15 NR (for example, $N_{TA}$ described in section 4.2 of TS38 213) and a timing adjustment value with a granularity coarser than the fine granularity may be used. Further, a timing adjustment value with a granularity of Tc and a timing adjustment value with a granularity coarser than that of the timing adjustment value with a granularity of Tc may be used. The coarse granularity timing adjustment value may also be of a granularity in slot length and/or a granularity in OFDM symbol length. The slot length and/or the OFDM symbol length may be a value dependent on the SCS (subcarrier spacing) or may be a value independent of the SCS.

The base station may also notify the terminal of information about the granularity of a scaling factor (coefficient) of the cell-specific TA offset or the like, and for example, the terminal may use, as the TA offset value, a value obtained by multiplying the notified cell-specific TA offset value by the scaling factor. By adjusting the scaling factor according to the operation environment such as the beam size, it is possible to adjust the range of the TA offset value using the number of bits of the same cell-specific TA offset in the broadcast information.

The timing adjustment based on the GNSS/ephemeris location information and the timing adjustment based on the path tracking in the above embodiments are not performed in accordance with commands from the base station, but are autonomously performed by the terminal. Although the base station detects the reception timing with respect to the received signal from the terminal, the accuracy of the reception timing detection can deteriorate when the reception timing changes greatly during detection within an averaging window. Therefore, for the timing adjustment performed autonomously by the terminal, the minimum interval and/or minimum timing change width for the timing adjustment may be defined, and the terminal may be configured to change the reception timing within a defined range. Information on the minimum interval and/or the minimum change width may also be notified by the base station to the terminal.

Further, in the above embodiments, the terminal may perform the timing adjustment based on the GNSS/ephemeris location information and the timing adjustment based on the path tracking by using an indication from the base station as a trigger.

Note that, the cell may be an area defined by the reception power of the SSB and/or a CSI-RS transmitted by the base station (satellite), or may be an area defined by the geographical position. Further, the cell in the above embodiments may be replaced with a beam defined by the SSB.

The Satellite ephemeris information, which is information on the positions of satellites, may be broadcast using the system information or the like, or may be held in advance by a terminal (or a base station). Further, the terminal (or the base station) may update the Satellite ephemeris information when communication is enabled. Further, the terminal (or base station) may also use other information to identify the position of the satellite. Regarding the satellite ephemeris information, information in a format called a Two Line Elements (TLE) format or Position and Velocity (PV) information that is information on the location, moving speed, and direction of the satellite may be used as the information indicating the location of the satellite.

Note that the above embodiments have been described in connection with the case where the location information can be utilized, but for a terminal that does not have a GNSS function and/or a terminal that cannot obtain information on the location of a satellite, a timing control may be performed in accordance with timing control information common to the cell that is broadcast by a base station instead of the timing control based on the location information. In this case, the base station may transmit the timing control information corresponding to a propagation delay amount in the vicinity of the cell center.

In other words, when PUSCH assignment is not PUSCH assignment by a Configured grant, i.e., is not PUSCH assignment by the DCI, the slot timing for PUSCH transmission is not adjusted with respect to the DCI reception timing. Thus, the terminal may transmit the PUSCH without using TA command 2.

The uses of the cell-specific TA offset, TA command 1, TA command 2, and the TA value notification from the terminal are not limited to those described above.

When there are a plurality of TA groups (TAGs) in a system using a plurality of cells, Component carriers, or transmission/reception points, the TA control illustrated in the present embodiments may be performed for each of the TA groups. In addition, some parameters such as the cell-specific TA offset may be used in common.

Although the timing adjustment value based on the location information has been described as the fine granularity timing adjustment value, it may be regarded as a coarse granularity timing adjustment value in view of the accuracy of the location information and the like.

The base station may be referred to as gNodeB or gNB. Further, the terminal may be referred to as UE.

The slot may be replaced by "time slot," "minislot," "frame," "subframe," or the like.

<5G NR System Architecture and Protocol Stack>

3GPP has been working at the next release for the 5th generation cellular technology, simply called 5G, including the development of a new radio access technology (NR) operating in frequencies ranging up to 100 GHz. The first version of the 5G standard was completed at the end of 2017, which allowed proceeding to 5G NR standard-compliant trials and commercial deployments of terminals (e.g., smartphones).

Figure 13:
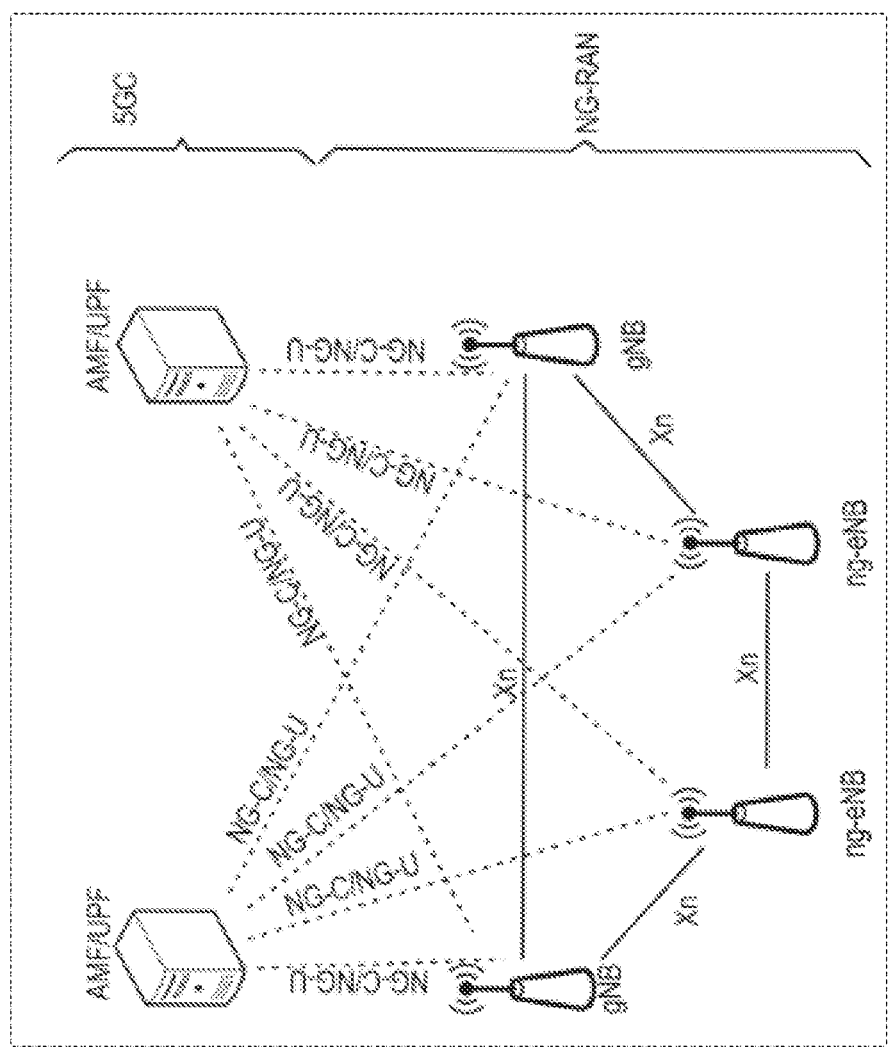
FIG. 13 illustrates an exemplary architecture of a 3GPP NR system.

For example, the overall system architecture assumes an NG-RAN (Next Generation-Radio Access Network) that includes gNBs. The gNB provides the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 13 (see e.g., 3GPP TS 38.300 v15.6.0, section 4).

The user plane protocol stack for NR (see e.g., 3GPP TS 38.300, section 4.4.1) includes the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new Access Stratum (AS) sublayer (SDAP, Service Data Adaptation Protocol) is introduced above the PDCP (see e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC, and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1?10?5 within 1 ms). Finally, mMTC may preferably require high connection density (1,000,000 devices/km² in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 Hz . . . are being considered at the moment. The symbol duration Tu and the subcarrier spacing $\Delta f$ are directly related through the formula $\Delta f=1/Tu$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

<Functional Split between NG-RAN and 5GC in 5G NR>

Figure 14:
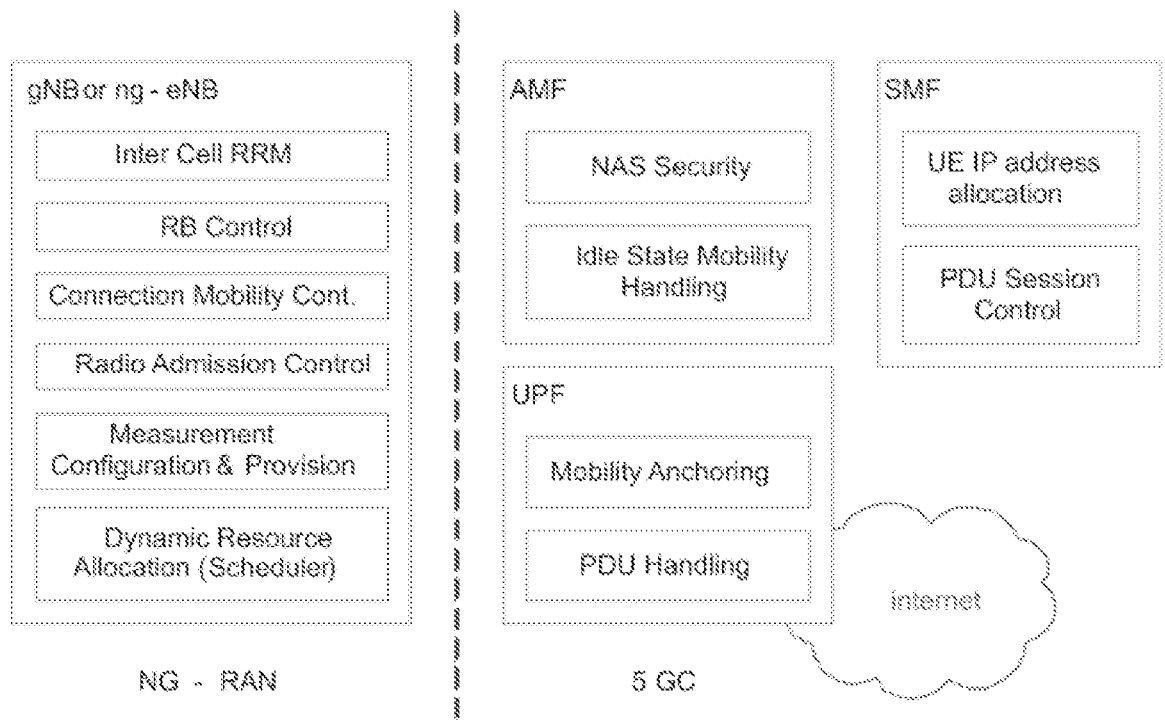
FIG. 14 schematically illustrates a functional split between NG-RAN and 5GC.

FIG. 14 illustrates the functional split between the NG-RAN and the 5GC. A logical node of the NG-RAN is gNB or ng-eNB. The 5GC includes logical nodes AMF, UPF, and SMF.

For example, gNB and ng-eNB hosts the following main functions:

Radio Resource Management functions such as Radio Bearer Control, Radio Admission Control, Connection Mobility Control, and dynamic allocation (scheduling) of both uplink and downlink resources to a UE;
IP header compression, encryption, and integrity protection of data;
Selection of an AMF during UE attachment in such a case when no routing to an AMF can be determined from the information provided by the UE;
Routing user plane data towards the UPF;
Routing control plane information towards the AMF;
Connection setup and release;
Scheduling and transmission of paging messages;
Scheduling and transmission of system broadcast information (originated from the AMF or an action management maintenance function (OAM: Operation, Admission, Maintenance));
Measurement and measurement reporting configuration for mobility and scheduling;
Transport level packet marking in the uplink;
Session management;
Support of network slicing;
QoS flow management and mapping to data radio bearers;
Support of UEs in the RRC_INACTIVE state;
Distribution function for NAS messages;
Radio access network sharing;
Dual connectivity; and
Tight interworking between NR and E-UTRA.

The Access and Mobility Management Function (AMF) hosts the following main functions:

Function of Non-Access Stratum (NAS) signaling termination;
NAS signaling security;
Access Stratum (AS) security control;
Inter-Core Network (CN) node signaling for mobility between 3GPP access networks;
Idle mode UE reachability (including control and execution of paging retransmission);
Registration area management;
Support of intra-system and inter-system mobility;
Access authentication;
Access authorization including check of roaming rights;
Mobility management control (subscription and policies);
Support of network slicing; and
Session Management Function (SMF) selection.

In addition, the User Plane Function (UPF) hosts the following main functions:

Anchor Point for intra-/inter-RAT mobility (when applicable);
External Protocol Data Unit (PDU) session point for interconnection to a data network;
Packet routing and forwarding;
Packet inspection and a user plane part of Policy rule enforcement;
Traffic usage reporting;

Uplink classifier to support routing traffic flows to a data network;

Branching point to support multi-homed PDU session;

QoS handling for user plane (e.g., packet filtering, gating, UL/DL rate enforcement);

Uplink traffic verification (SDF to QoS flow mapping); and

Function of downlink packet buffering and downlink data notification triggering.

Finally, the Session Management Function (SMF) hosts the following main functions:

Session management;

UE IP address allocation and management;

Selection and control of UPF;

Configuration function for traffic steering at the User Plane Function (UPF) to route traffic to a proper destination;

Control part of policy enforcement and QoS; and

Downlink data notification.

<RRC Connection Setup and Reconfiguration Procedure>

Figure 15:
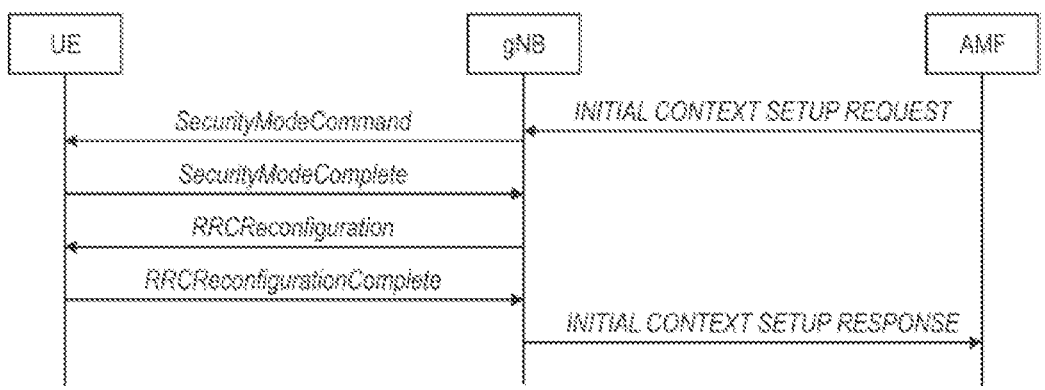
FIG. 15 is a sequence diagram of an RRC Connection Setup/Reconfiguration Procedure.

FIG. 15 illustrates some interactions between a UE, gNB, and AMF (a 5GC Entity) performed in the context of a transition of the UE from RRC_IDLE to RRC_CONNECTED for the NAS part (see TS 38 300 v15.6.0).

The RRC is higher layer signaling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not set up. Finally, the gNB informs the AMF that the setup procedure is completed with INITIAL CONTEXT SETUP RESPONSE.

Thus, the present disclosure provides a 5th Generation Core 5GC) entity (e.g., AMF, SMF, or the like) including control circuitry, which, in operation, establishes a Next Generation (NG) connection with a gNodeB, and a transmitter, which, in operation, transmits an initial context setup message to the gNodeB via the NG connection such that a signaling radio bearer between the gNodeB and a User Equipment (UE) is configured up. Specifically, the gNodeB transmits Radio Resource Control (RRC) signaling including a resource allocation configuration Information Element (IE) to the UE via the signaling radio bearer. Then, the UE performs an uplink transmission or a downlink reception based on the resource allocation configuration.

<Usage Scenarios of IMT for 2020 and Beyond>

Figure 16:
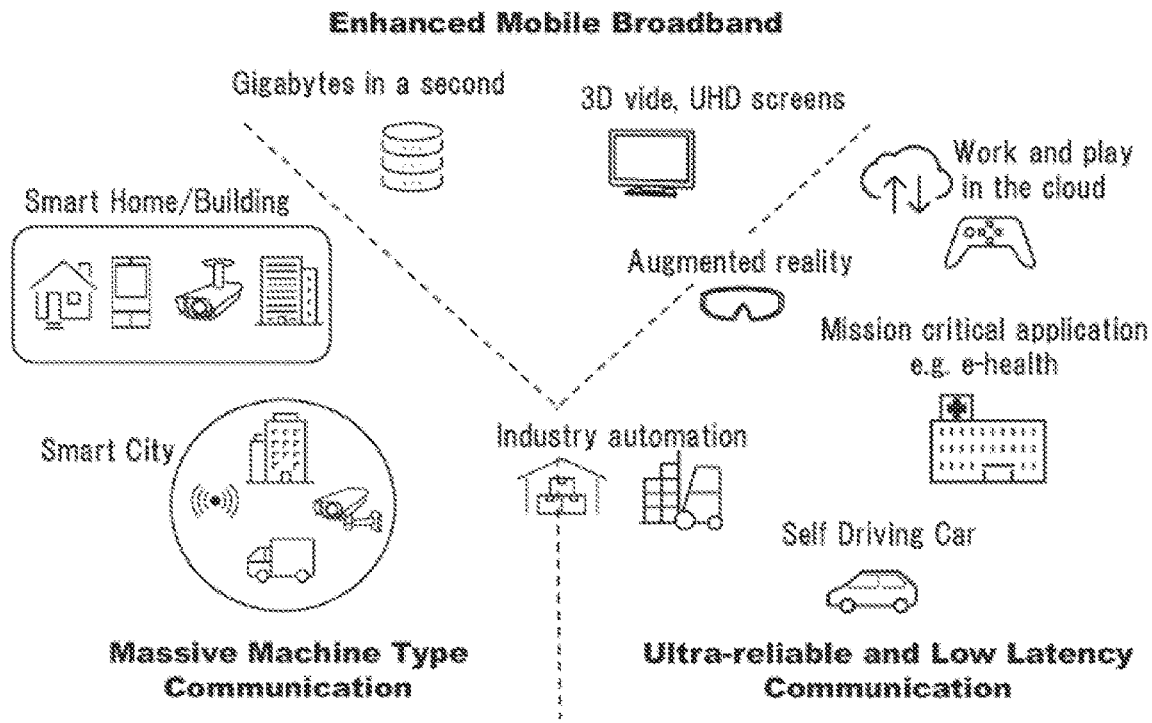
FIG. 16 schematically illustrates usage scenarios of enhanced Mobile BroadBand (eMBB), massive Machine Type Communications (mMTC), and Ultra Reliable and Low Latency Communications (URLLC)

FIG. 16 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 16 illustrates some examples of envisioned usage scenarios for IMT for 2020 and beyond (see e.g., ITU-R M.2083 FIG. 14).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements configured by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement in general, regardless of particular communication scenarios.

For NR URLLC, further use cases with tighter requirements have been identified such as factory automation, transport industry and electrical power distribution. The tighter requirements are higher reliability (up to 10-6 level), higher availability, packet sizes of up to 256 bytes, time synchronization down to the order of a few µs where the value can be one or a few µs depending on frequency range and short latency in the order of 0.5 to 1 ms in particular a target user plane latency of 0.5 ms, depending on the use cases.

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements are possible. The term "mini-slot" refers to a Transmission Time Interval (TTI) including a smaller number of symbols than a slot (a slot comprising fourteen symbols).

<QoS Control>

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearer (DRB) together with the PDU Session, e.g., as illustrated above with reference to FIG. 15. Further, additional DRB(s) for QoS flow(s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 17:
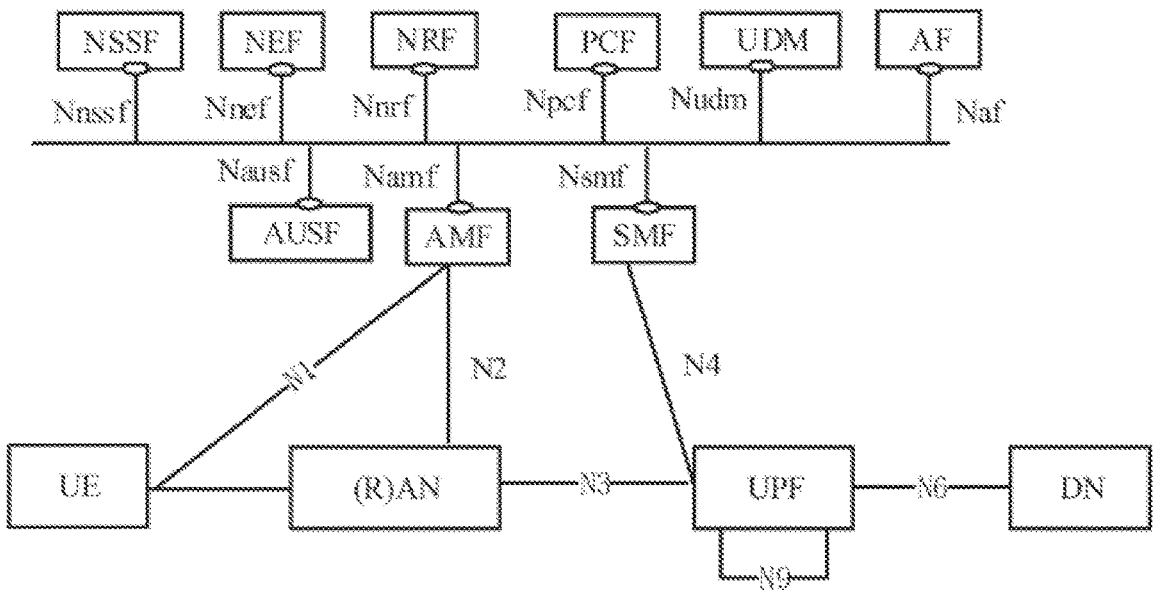
FIG. 17 is a block diagram illustrating an exemplary 5G system architecture for a non-roaming scenario.

FIG. 17 illustrates a 5G NR non-roaming reference architecture (see TS 23.501 v16.1.0, section 4.23). An Application Function (AF), e.g., an external application server hosting 5G services, exemplarily described in FIG. 16, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 17 illustrates further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services. All of or a part of the core network functions and the application services may be deployed and running on cloud computing environments.

In the present disclosure, thus, an application server (for example, AF of the 5G architecture), is provided that includes: a transmitter, which, in operation, transmits a request containing a QoS requirement for at least one of URLLC, eMMB and mMTC services to at least one of functions (for example NEF, AMF, SMF, PCF,UPF, etc.) of the 5GC to establish a PDU session including a radio bearer between a gNodeB and a UE in accordance with the QoS requirement; and control circuitry, which, in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

When future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (loT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

A transmission apparatus according to one exemplary embodiment of the present disclosure includes: control circuitry, which, in operation, controls a transmission timing based on first information on a control on the transmission timing of a signal in a transmission unit for the signal and second information on the control on the transmission timing in a unit finer than the transmission unit; and transmission circuitry, which, in operation, performs signal transmission based on the control on the transmission timing by the control circuitry.

In one exemplary embodiment of the present disclosure, the first information is at least one of third information specific to a cell, fourth information specific to the transmission apparatus, and fifth information indicating a timing control.

In one exemplary embodiment of the present disclosure, the second information is at least one of sixth information, seventh information, and eighth information, the sixth information being determined based on a location of the transmission apparatus and a location of a reception apparatus being a communication partner of the transmission apparatus, the seventh information being determined from a path arrival timing of a signal reaching the transmission apparatus, the eighth information indicating a timing control.

In one exemplary embodiment of the present disclosure, the transmission circuitry transmits information on the eighth information to the reception apparatus in case that a change in at least one of the location of the transmission apparatus, the location of the reception apparatus, and the first value is equal to or greater than a threshold.

In one exemplary embodiment of the present disclosure, the information on the eighth information is at least one of the eighth information, location information of the transmission apparatus, and location information of the reception apparatus.

A transmission method according to one exemplary embodiment of the present disclosure includes steps performed by a transmission apparatus of: controlling a transmission timing based on first information on a control on the transmission timing of a signal in a transmission unit for the signal and second information on the control on the transmission timing in a unit finer than the transmission unit; and performing signal transmission based on the control on the transmission timing.

The disclosure of Japanese Patent Application No. 2020-022772, filed on Feb. 13, 2020, including the specification, drawings and abstract is incorporated herein by reference in its entirety.

INDUSTRIAL APPLICABILITY

One aspect of the present disclosure is useful for radio communication systems.

REFERENCE SIGNS LIST

100 Terminal
101 PRACH generator
102, 206 Data generator
103 Location information obtainer
104 Timing adjuster
105, 208 Radio transmitter
106, 201 Antenna
107, 202 Radio receiver
108 Demodulator/decoder
109, 209 Controller
200 Base station
203 Data reception processor
204 PRACH detector
205 Timing information generator
207 Data transmission processor

The invention claimed is:

1. A transmission apparatus, comprising:
control circuitry, which, in operation, controls a transmission timing based on first information and
second information, a unit of the second information on the control of the transmission timing being finer than that of the first information; and
transmission circuitry, which, in operation, performs signal transmission based on the control of the transmission timing,
wherein,
the transmission timing is further controlled based on third information,
the third information determined based on a location of the transmission apparatus and
a location of a reception apparatus in communication with the transmission apparatus, and
the transmission circuitry, in operation,
transmits fourth information relating to the second information to the reception apparatus in case that a change in a value relating to the second information is equal to or greater than a threshold.

2. The transmission apparatus according to claim 1, wherein
the first information is determined based on fifth information specific to a cell and sixth information specific to the transmission apparatus.

3. The transmission apparatus according to claim 1, wherein
the fourth information indicates a number of slots, which is a coarser granularity value than the second information.

4. The communication method according to claim 1, wherein the unit of the first information is a number of slots.

5. The transmission apparatus according to claim 1, wherein the reception apparatus is a satellite.

6. The transmission apparatus according to claim 1, wherein the value relating to the second information is the fourth information.

7. The transmission apparatus according to claim 1, wherein the value relating to the second information is a timing advance (TA) value.

8. The transmission apparatus according to claim 1, wherein the first information is a slot offset in units of slot, and the second information is an adjustment offset in units of msec.

9. A communication method, comprising:
controlling a transmission timing of a transmission apparatus based on first information and
second information, a unit of the second information on the control of the transmission timing being finer than that of the first information;
wherein the transmission timing is further controlled based on third information,
the third information determined based on a location of the transmission apparatus and
a location of a reception apparatus in communication with the transmission apparatus;
performing signal transmission from the transmission apparatus based on the control of the transmission timing; and
controlling transmission of fourth information relating to the second information to the reception apparatus in case that a change in a value relating to the second information is equal to or greater than a threshold.

10. The communication method according to claim 9, wherein
the first information is determined based on fifth information specific to a cell and sixth information specific to the transmission apparatus.

11. The communication method according to claim 9, wherein
the fourth information indicates a number of slots, which is a coarser granularity value than the second information.

12. The communication method according to claim 9, wherein the unit of the first information is a number of slots.

* * * * *